(12) United States Patent
Okuma et al.

(10) Patent No.: US 11,220,181 B2
(45) Date of Patent: Jan. 11, 2022

(54) OPERATION CONTROL DEVICE, OPERATION CONTROL METHOD, AND STORAGE MEDIUM

(71) Applicant: HONDA MOTOR CO., LTD., Tokyo (JP)

(72) Inventors: Kenji Okuma, Wako (JP); Weifeng Zhang, Wako (JP); Takashi Kusaka, Wako (JP); Katsuya Ikenobu, Wako (JP); Hiromi Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/991,064

(22) Filed: Aug. 12, 2020

(65) Prior Publication Data

US 2021/0053440 A1 Feb. 25, 2021

(51) Int. Cl.
*B60K 35/00* (2006.01)
*G06K 9/00* (2006.01)
*G09G 5/00* (2006.01)

(52) U.S. Cl.
CPC .......... *B60K 35/00* (2013.01); *G06K 9/00355* (2013.01); *G06K 9/00845* (2013.01); *G09G 5/00* (2013.01); *B60K 2370/149* (2019.05); *B60K 2370/152* (2019.05); *G09G 2354/00* (2013.01); *G09G 2380/10* (2013.01)

(58) Field of Classification Search
CPC .. G06K 9/00845; G06K 9/00355; G09G 5/00; G09G 2354/00; G09G 2380/10; B60K 35/00; B60K 2370/167; B60K 2370/152; B60K 2370/149; B60K 2370/52; B60K 2370/146
See application file for complete search history.

(56) References Cited

U.S. PATENT DOCUMENTS

| | | | | |
|---|---|---|---|---|
| 6,256,558 | B1 * | 7/2001 | Sugiura | B60K 37/06 701/1 |
| 6,668,221 | B2 * | 12/2003 | Harter, Jr. | B60K 35/00 701/36 |
| 8,301,108 | B2 * | 10/2012 | Naboulsi | G08B 21/06 455/345 |
| 9,475,389 | B1 * | 10/2016 | Fung | B60K 35/00 |

(Continued)

FOREIGN PATENT DOCUMENTS

JP 2012-153329 8/2012

*Primary Examiner* — Christopher E Leiby
(74) *Attorney, Agent, or Firm* — Amin, Turocy & Watson, LLP

(57) ABSTRACT

An operation control device includes a line-of-sight detector configured to detect a line of sight of a driver of a vehicle on the basis of an image of an interior of the vehicle captured by an imaging device provided in the vehicle, a hand state detector configured to detect a hand state of the driver on the basis of the image, a driving state determiner configured to determine whether the detected hand state is a first state in which it is estimated that a driving operation of the vehicle is being performed or a second state in which it is estimated that the driving operation is not being performed, a traveling state detector configured to detect a traveling state of the vehicle, and an operation restrictor configured to restrict reception of an operation on an operator including a display device arranged within the vehicle.

9 Claims, 9 Drawing Sheets

(56) References Cited

U.S. PATENT DOCUMENTS

| | | | |
|---|---|---|---|
| 2008/0129684 A1* | 6/2008 | Adams | B60K 35/00 345/156 |
| 2009/0231145 A1* | 9/2009 | Wada | A61B 5/02416 340/575 |
| 2011/0224897 A1* | 9/2011 | Tan | G01C 21/3664 701/532 |
| 2015/0268746 A1* | 9/2015 | Cuddihy | G06F 3/041 345/173 |
| 2015/0283904 A1* | 10/2015 | Schlittenbauer | B60K 35/00 345/173 |
| 2015/0328986 A1* | 11/2015 | Nordbruch | G08G 1/096741 701/522 |
| 2016/0016473 A1* | 1/2016 | Van Wiemeersch | B60N 2/002 701/36 |
| 2016/0124225 A1* | 5/2016 | Kwak | B60R 11/04 348/115 |
| 2017/0364148 A1* | 12/2017 | Kim | G09G 5/14 |
| 2018/0129891 A1* | 5/2018 | Ryu | B60W 40/04 |
| 2018/0201276 A1* | 7/2018 | Matsumura | B60W 50/14 |
| 2018/0326851 A1* | 11/2018 | Kim | G06F 3/0488 |
| 2019/0289185 A1* | 9/2019 | Matsuura | B60R 11/04 |
| 2019/0317495 A1* | 10/2019 | Yang | B60W 30/095 |

* cited by examiner

OPERATION CONTROL DEVICE, OPERATION CONTROL METHOD, AND STORAGE MEDIUM

CROSS-REFERENCE TO RELATED APPLICATION

Priority is claimed on Japanese Patent Application No. 2019-152115, filed Aug. 22, 2019, the content of which is incorporated herein by reference.

BACKGROUND

Field of the Invention

The present invention relates to an operation control device, an operation control method, and a storage medium.

Description of Related Art

Conventionally, technology related to a vehicle in which a contact sensor for detecting that a driver is holding a predetermined portion of a steering wheel is provided on the steering wheel has been disclosed (see, for example, Japanese Unexamined Patent Application, First Publication No. 2012-153329). In the related art, a vehicle information display device such as an in-vehicle navigation device on which an operation input by an occupant other than a driver is received even if the vehicle is traveling when a contact sensor detects that at least the driver's hand on a passenger seat side is holding a predetermined portion of a steering wheel has been implemented. In the related art, a process of detecting a line of sight of a driver using a camera and receiving an operation input by an occupant other than the driver if the line of sight of the driver is outside of an operation input unit has been disclosed.

However, for example, it is difficult to accurately detect a state in which a driver is driving in consideration of the time when a method in which the driver holds the steering wheel is changed during driving or the like in a detection process of a contact sensor provided on the steering wheel even if the line of sight of the driver is detected in the related art.

SUMMARY

The present invention has been made on the basis of recognition of the above-described problems and an objective of the present invention is to provide an operation control device, an operation control method, and a storage medium capable of more accurately recognizing a driving state of a driver and controlling reception of an operation on an operator by an occupant other than a driver.

An operation control device, an operation control method, and a storage medium according to the present invention adopt the following configurations.

(1): According to an aspect of the present invention, there is provided an operation control device including: a line-of-sight detector configured to detect a line of sight of a driver of a vehicle on the basis of an image of an interior of the vehicle captured by an imaging device provided in the vehicle; a hand state detector configured to detect a hand state of the driver on the basis of the image; a driving state determiner configured to determine whether the detected hand state is a first state in which it is estimated that a driving operation of the vehicle is being performed or a second state in which it is estimated that the driving operation is not being performed; a traveling state detector configured to detect a traveling state of the vehicle; and an operation restrictor configured to restrict reception of an operation on an operator including a display device arranged within the vehicle, wherein the operation restrictor is configured to not restrict the reception of the operation in a case where the vehicle is in a stopped state, wherein the operation restrictor is configured to not restrict the reception of the operation in a case where the vehicle is in the traveling state, a direction of the detected line of sight is facing a predetermined region on a side in front of the driver, and the detected hand state is the first state, and wherein the operation restrictor is configured to restrict the reception of the operation in a case where the vehicle is in the traveling state, and the direction of the detected line of sight is not facing the predetermined region or the detected hand state is the second state.

(2): In the above-described aspect (1), the predetermined region includes at least a region of a part or all of a front windshield of the vehicle and a region near a side mirror.

(3): In the above-described aspect (1), the operation restrictor is configured to not restrict the reception of the operation during a first predetermined time period from a point in time when a third state in which detection of one or both of the direction of the line of sight and the hand state is impossible is reached in a state in which the reception of the operation is not restricted.

(4): In the above-described aspect (3), the operation restrictor is configured to initialize a timer for measuring the first predetermined time period at a point in time when the direction of the detected line of sight is facing the predetermined region and the detected hand state is the first state after the third state is lost.

(5): In the above-described aspect (1), the operation control device further includes: a traveling stability detector configured to detect stability of the traveling state of the vehicle; and a disturbance detector configured to detect a fourth state in which detection of one or both of the direction of the line of sight and the hand state is disabled by an occupant other than the driver on the basis of the image, wherein the operation restrictor is configured to continue a state in which the reception of the operation is not restricted in a case where the disturbance detector detects the fourth state and the traveling stability detector detects that the traveling state of the vehicle is stable in the state in which the reception of the operation is not restricted.

(6): In the above-described aspect (1), the operation control device further includes: a traveling stability detector configured to detect stability of the traveling state of the vehicle; and a disturbance detector configured to detect a fourth state in which detection of one or both of the direction of the line of sight and the hand state is disabled due to a factor other than the driver on the basis of the image, wherein the operation restrictor is configured to continue a state in which the reception of the operation is not restricted in a case where the disturbance detector detects the fourth state and the traveling stability detector detects that the traveling state of the vehicle is stable in the state in which the reception of the operation is not restricted.

(7): In the above-described aspect (5), the operation restrictor is configured to continue a state in which the reception of the operation is not restricted during a second predetermined time period after a state in which the reception of the operation is not restricted, the disturbance detector detects the fourth state, and the traveling stability detector detects that the traveling state of the vehicle is stable is reached.

(8): In the above-described aspect (7), the operation restrictor is configured to initialize a timer for measuring the second predetermined time period at a point in time when the direction of the detected line of sight is facing the predetermined region and the detected hand state is the first state after the fourth state is no longer detected by the disturbance detector.

(9): According to an aspect of the present invention, there is provided an operation control method using a computer including: detecting a line of sight of a driver of a vehicle on the basis of an image of an interior of the vehicle captured by an imaging device provided in the vehicle; detecting a hand state of the driver on the basis of the image; determining whether the detected hand state is a first state in which it is estimated that a driving operation of the vehicle is being performed or a second state in which it is estimated that the driving operation is not being performed; detecting a traveling state of the vehicle; releasing a restriction on reception of an operation on an operator including a display device arranged within the vehicle in a case where the vehicle is in a stopped state; releasing the restriction on the reception of the operation in a case where the vehicle is in the traveling state, a direction of the detected line of sight is facing a predetermined region on a side in front of the driver, and the detected hand state is the first state; and restricting the reception of the operation in a case where the vehicle is in the traveling state, and the direction of the detected line of sight is not facing the predetermined region or the detected hand state is the second state.

(10): According to an aspect of the present invention, there is provided a computer-readable non-transitory storage medium storing a program for causing a computer to: detect a line of sight of a driver of a vehicle on the basis of an image of an interior of the vehicle captured by an imaging device provided in the vehicle; detect a hand state of the driver on the basis of the image; determine whether the detected hand state is a first state in which it is estimated that a driving operation of the vehicle is being performed or a second state in which it is estimated that the driving operation is not being performed; detect a traveling state of the vehicle; release a restriction on reception of an operation on an operator including a display device arranged within the vehicle in a case where the vehicle is in a stopped state; release the restriction on the reception of the operation in a case where the vehicle is in the traveling state, a direction of the detected line of sight is facing a predetermined region on a side in front of the driver, and the detected hand state is the first state; and restrict the reception of the operation in a case where the vehicle is in the traveling state, and the direction of the detected line of sight is not facing the predetermined region or the detected hand state is the second state.

According to the above-described aspects (1) to (10), it is possible to more accurately recognize a driving state of a driver and control reception of an operation on an operator by an occupant other than a driver.

DETAILED DESCRIPTION OF THE INVENTION

Hereinafter, embodiments of an operation control device, an operation control method, and a storage medium of the present invention will be described with reference to the drawings. In the following description, an example when an operation on a navigation device is controlled in the operation control device of the present invention will be described. Although a case in which left-hand traffic regulations are applied will be described, it is only necessary to reverse the left and right when right-hand traffic regulations are applied.

First Embodiment

[Overall Configuration of Operation Control System 1]

Figure 1:
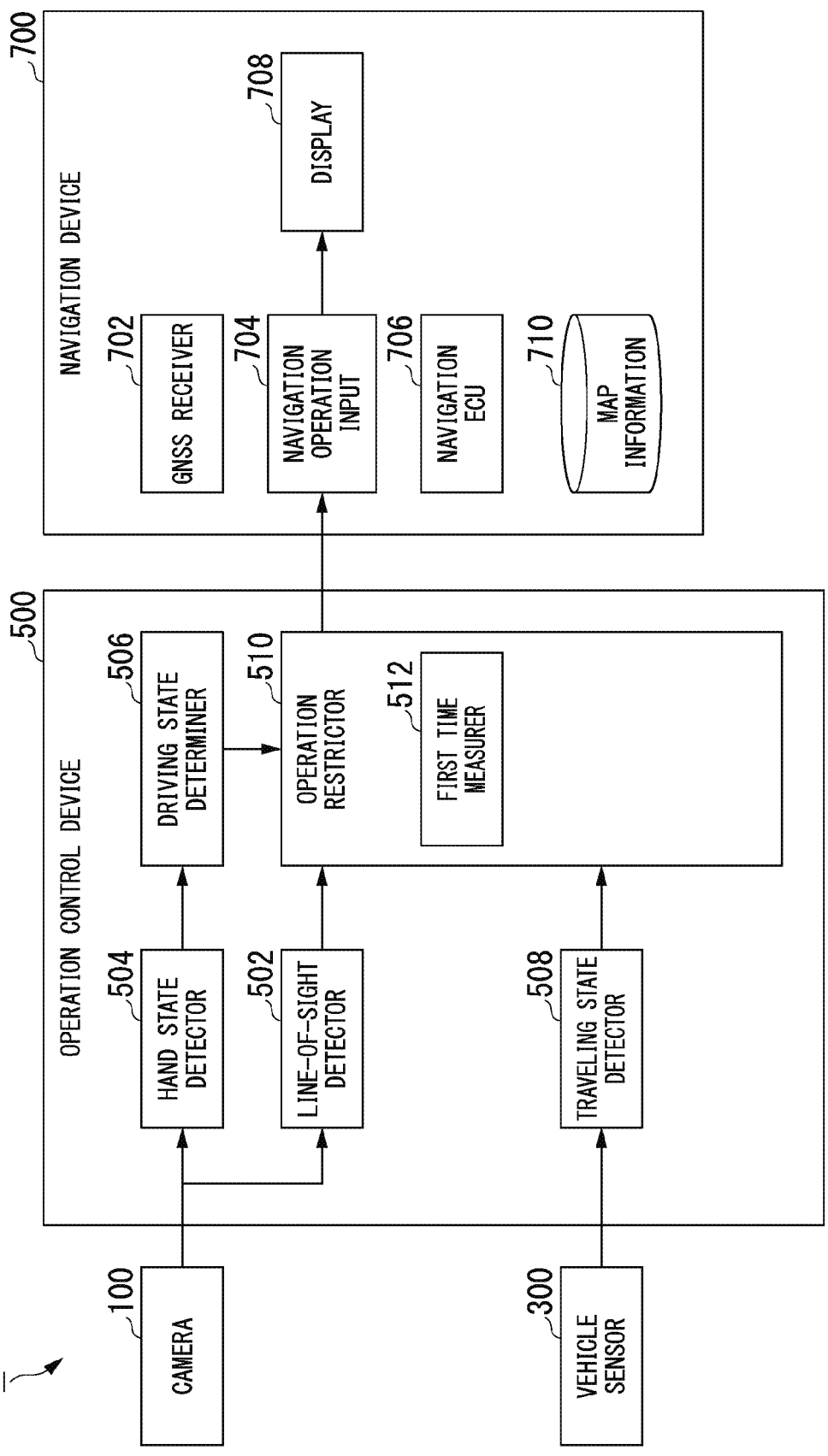
FIG. 1 is a schematic configuration diagram of an operation control system including an operation control device according to a first embodiment.

FIG. 1 is a configuration diagram of an operation control system 1 including an operation control device 500 according to a first embodiment. A vehicle equipped with the operation control system 1 is, for example, a four-wheeled vehicle. A driving source of the vehicle is an internal combustion engine such as a diesel engine or a gasoline engine, an electric motor, or a combination thereof. The electric motor operates using electric power generated by a power generator connected to the internal combustion engine, or electric power with which a secondary battery or a fuel cell is discharged.

The operation control system 1 includes, for example, a camera 100, a vehicle sensor 300, the operation control device 500, and a navigation device 700.

For example, the camera 100 is a digital camera using a solid-state imaging element such as a charge coupled device (CCD) or a complementary metal oxide semiconductor (CMOS). The camera 100 is attached to any position in the interior of the vehicle (hereinafter referred to as a host vehicle M) in which the operation control system 1 is mounted. The camera 100 is arranged, for example, at a central position at the front in the interior of the host vehicle M. The camera 100 outputs an image obtained by photographing the interior of the host vehicle M from the position where the camera 100 is arranged to the operation control device 500. The camera 100 is an example of an "imaging device" in the claims.

[Example of Arrangement of Camera 100]

Figure 2:
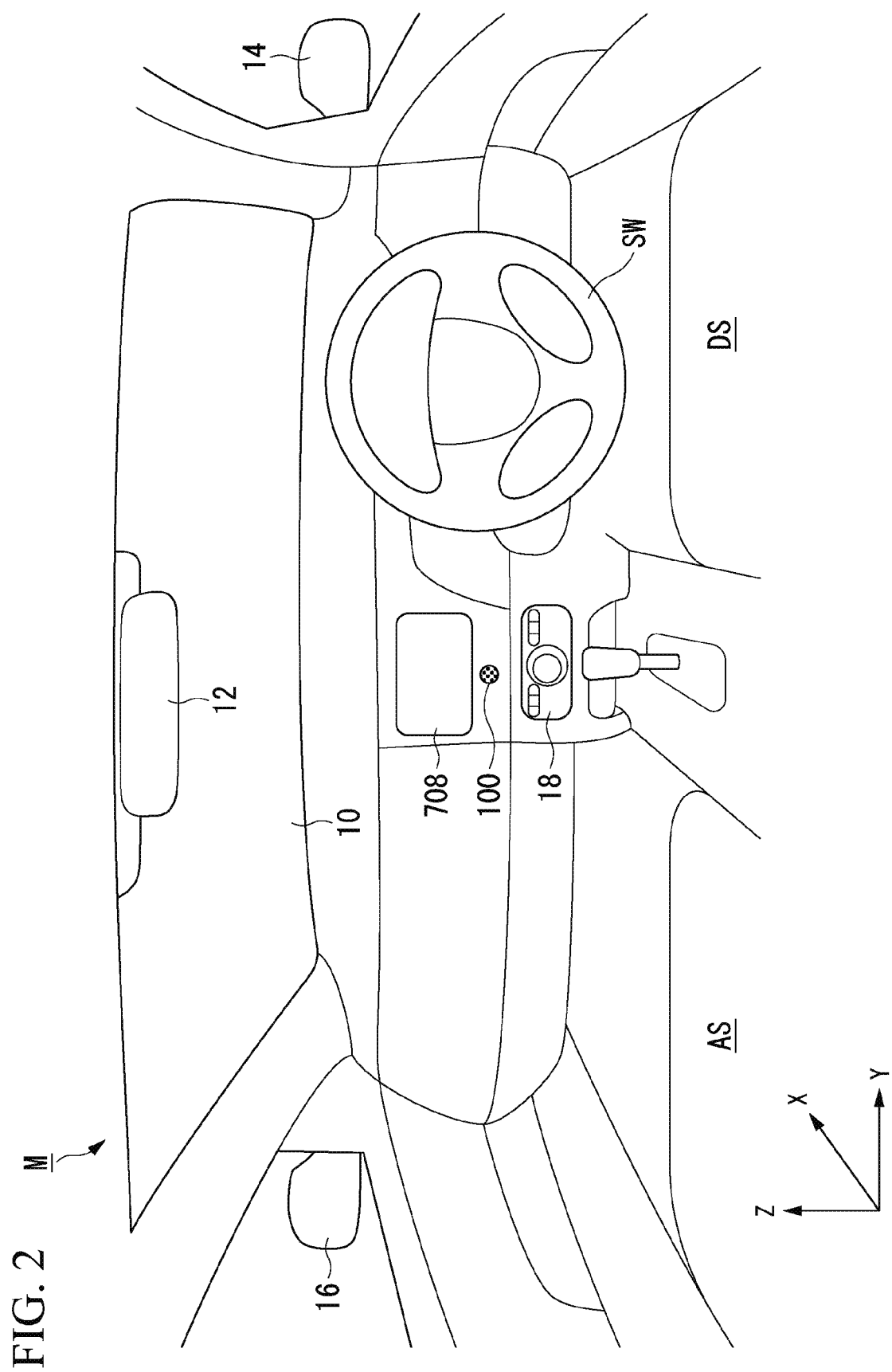
FIG. 2 is a diagram showing an example of an arrangement position of a camera constituting the operation control system.

Here, an example of an arrangement of the camera 100 in the interior of the host vehicle M will be described. FIG. 2 is a diagram showing an example of an arrangement position of the camera 100 constituting the operation control system 1.

In the interior of the host vehicle M, for example, a driver seat DS provided with a steering wheel SW and a passenger seat AS provided in a vehicle width direction (a Y-direction in FIG. 2) with respect to the driver seat DS are provided. For example, a front windshield 10 such as a windshield is present in a front window frame in the interior of the host vehicle M. A driver sitting in the driver seat DS can recognize a situation in front and outside of the vehicle via the front windshield 10. In the interior of the host vehicle M, a rearview mirror 12 is provided on a front upper part (an upper part of a region of the front windshield 10). A side mirror 14 is provided on the outside of the vehicle in front of the door on the driver seat DS side and a side mirror 16 is provided on the outside of the vehicle in front of the door on the passenger seat AS side. The driver sitting in the driver seat DS can recognize a situation behind the vehicle via the rearview mirror 12, the side mirror 14, and the side mirror 16. A display 708 of the navigation device 700 to be described below is arranged on a front central portion (a dashboard between the driver seat DS and the passenger seat AS in FIG. 2) in the interior of the host vehicle M. For example, an operator (hereinafter referred to as a center console) 18 for operating an air conditioner of the host vehicle M or the like is arranged under the display 708. The camera 100 is arranged, for example, at a position between the display 708 and the center console 18. The camera 100 outputs an image obtained by photographing the interior of the host vehicle M from the arrangement position thereof as shown in FIG. 2 to the operation control device 500.

The arrangement of the camera 100 shown in FIG. 2 is only an example and the position where the camera 100 is arranged may be appropriately changed according to the configuration of the interior of the host vehicle M. Although the configuration in which the number of cameras 100 is one is shown in FIGS. 1 and 2, the number of cameras 100 is not limited to one. In other words, the operation control system 1 may have a configuration in which a plurality of cameras photograph a photographing range in which the camera 100 performs photographing to be described below.

Returning to FIG. 1, the vehicle sensor 300 detects whether or not the host vehicle M is in a traveling state. The vehicle sensor 300 includes, for example, a vehicle speed sensor that detects a speed of the host vehicle M, an acceleration sensor that detects acceleration, a yaw rate sensor that detects an angular velocity around a vertical axis, a direction sensor that detects a direction of the host vehicle M, and the like.

The operation control device 500 includes, for example, a line-of-sight detector 502, a hand state detector 504, a driving state determiner 506, a traveling state detector 508, and an operation restrictor 510. These components include, for example, a hardware processor such as a central processing unit (CPU) and a storage device (a storage device including a non-transitory storage medium) storing a program (software) and the function of each component is implemented by the processor executing the program. Some or all of these components provided in the operation control device 500 may be implemented, for example, by hardware (a circuit including circuitry) such as a large-scale integration (LSI) circuit, an application specific integrated circuit (ASIC), a field-programmable gate array (FPGA), or a graphics processing unit (GPU) or may be implemented by software and hardware in cooperation. Functions of some or all of these components provided in the operation control device 500 may be implemented by a dedicated LSI circuit. Here, the program (software) may be pre-stored in a storage device (a storage device including a non-transitory storage medium) such as a read only memory (ROM), a random access memory (RAM), a hard disk drive (HDD), or a flash memory or may be stored in a removable storage medium (a non-transitory storage medium) such as a DVD or a CD-ROM and installed in the storage device when the storage medium is mounted on a drive device. The program (software) may be pre-downloaded from another computer device through short-range communication or wide-region communication and installed in the storage device. The operation control device 500 is an example of an "operation control device" in the claims.

The line-of-sight detector 502 detects a direction of the line of sight of the driver (hereinafter referred to as a driver DR) of the host vehicle M sitting in the driver seat DS after the driver DR gets into the host vehicle M on the basis of an image of the interior of the host vehicle M output by the camera 100. The line-of-sight detector 502 pre-learns a method of detecting the direction of the line of sight of the driver DR from the image of the interior of the vehicle using a predetermined learning method and detects the direction of the line of sight of the driver DR in accordance with the learned method. The line-of-sight detector 502 outputs information indicating the detected line-of-sight direction of the driver DR to the operation restrictor 510.

[Example of Detection of Line of Sight of Driver DR in Line-of-Sight Detector 502]

Figure 3:
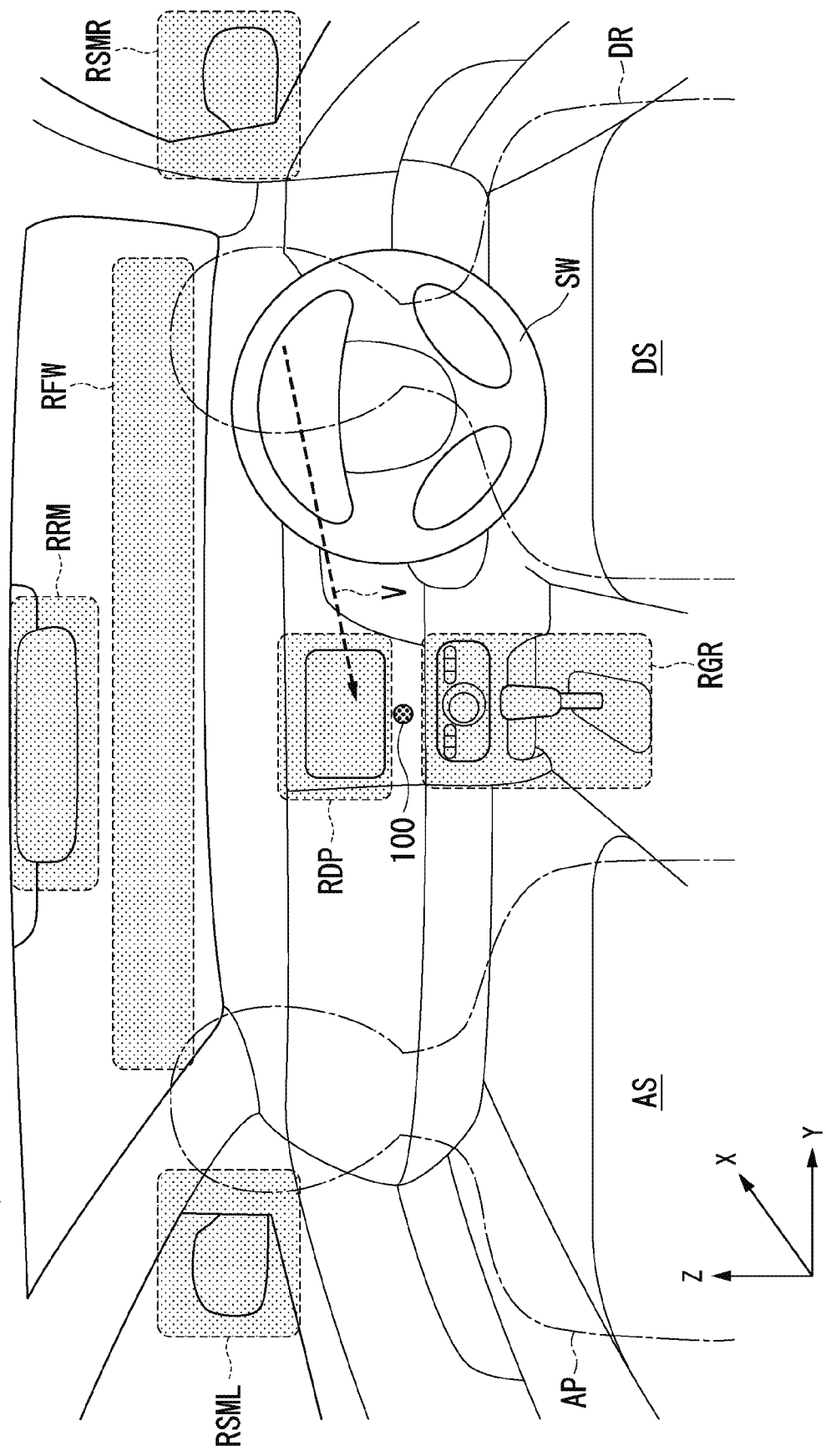
FIG. 3 is a diagram showing an example of a range of a line of sight of a driver detected by a line-of-sight detector on the basis of an image of an interior of a vehicle captured by the camera constituting the operation control system.

Here, an example of a method in which the line-of-sight detector 502 detects the direction of the line of sight of the driver DR will be described. FIG. 3 is a diagram showing an example of a range of the line of sight of the driver DR detected by the line-of-sight detector 502 on the basis of an image of the interior of the vehicle photographed by the camera 100 constituting the operation control system 1. In FIG. 3, a state in which a line-of-sight determination region for detecting a portion at which the line of sight of the driver DR is looking is set on a two-dimensional plane virtually set with the camera 100 as the center is shown. In FIG. 3, line-of-sight determination regions such as a line-of-sight determination region RFW of the front windshield 10, a line-of-sight determination region RRM of the rearview mirror 12, a line-of-sight determination region RSMR of the side mirror 14, a line-of-sight determination region RSML of the side mirror 16, a line-of-sight determination region RDP of the display 708 of the navigation device 700, and a line-of-sight determination region RGR including a region of a center console 18 or a gear shift lever of the host vehicle M are set. The line-of-sight detector 502 recognizes a direction of a face of the driver DR shown in an image of the interior of the host vehicle M output by the camera 100 and determines which line-of-sight determination region intersects a line of sight V of the driver DR (which line-of-sight determination region the driver DR is looking at) on the basis of the recognized direction of the face of the driver DR. In FIG. 3, an example of a state in which the line of sight V of the driver DR intersects the line-of-sight determination region RDP of the display 708 of the navigation device 700 (the face of the driver DR is facing the display 708) is shown. The line-of-sight detector 502 detects that the line-of-sight determination region determined to intersect the line of sight V of the driver DR is a portion at which the driver DR is looking. The line-of-sight detector 502 outputs information indicating the detected direction of the line of sight V of the driver DR to the operation restrictor 510.

For example, association between the line of sight V of the driver DR and the line-of-sight determination region that intersects the line of sight V, in other words, association between the direction of the face of the driver DR and the portion at which the driver DR is looking, may be performed by pre-designating a portion viewed by the driver DR (before traveling of the host vehicle M starts, at the time of initial setting, or the like) and learning the direction of the face shown in an image captured by the camera 100 at that time. For example, association between the direction of the face of the driver DR and the portion at which the driver DR is looking may be performed by designating a general person assumed to be the driver DR as a subject and performing learning for pre-associating the direction of the face of the subject and the line-of-sight determination region. A learning method for associating the direction of the face of the driver DR and the portion at which the driver DR is looking in the line-of-sight detector 502 is not limited to the above-described method and may be any method.

In addition to detecting the direction of the line of sight V of the driver DR, the line-of-sight detector 502 may also recognize a direction of a face or detect a direction of a line of sight of an occupant (hereinafter referred to as a fellow passenger AP) other than the driver DR of the host vehicle M sitting in the passenger seat AS after the fellow passenger AP gets into the host vehicle M and output information of the detected fellow passenger AP to the operation restrictor 510.

The hand state detector 504 detects a hand state (position) of the driver DR on the basis of an image of the interior of the host vehicle M output by the camera 100. The hand state detector 504 outputs information indicating the detected hand state (position) of the driver DR to the driving state determiner 506.

[Example of Detection of Hand State (Position) of Driver DR by Hand State Detector 504]

Figure 4:
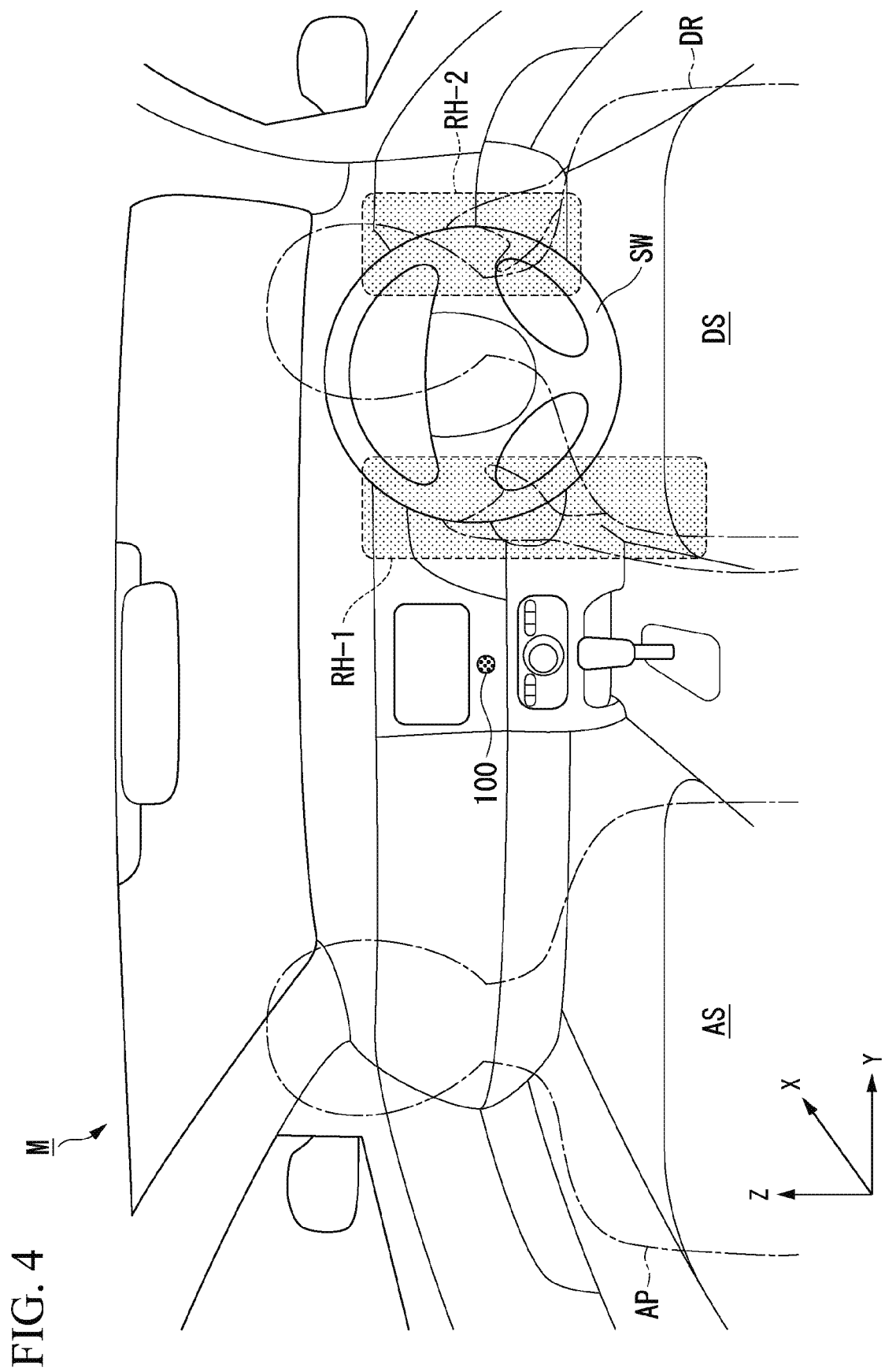
FIG. 4 is a diagram showing an example of a hand state of the driver detected by a hand state detector on the basis of an image of the interior of the vehicle captured by the camera constituting the operation control system.

Here, an example of a method in which the hand state detector 504 detects the hand state (position) of the driver DR will be described. FIG. 4 is a diagram showing an example of the hand state (position) of the driver DR detected by the hand state detector 504 on the basis of an image of the interior of the vehicle captured by the camera 100 constituting the operation control system 1. The hand state detector 504 recognizes a hand (including an arm) of the driver DR shown in the image of the interior of the host vehicle M output by the camera 100 and detects a region (a position) where the recognized hand of the driver DR is located. In FIG. 4, an example of a state in which it is detected that a left hand of the driver DR is located at a position of a region RH-1 including a region of the steering wheel SW and a right hand (including a right arm) of the driver DR is located at a position of a region RH-2 including a region of the steering wheel SW is shown. In other words, an example of a state in which the hand state detector 504 can determine that both the hands of the driver DR are located at the position of the steering wheel SW is shown. The hand state detector 504 outputs information indicating a position of a region where it is detected that the hand of the driver DR is located as information indicating the state (position) of the hand of the driver DR to the driving state determiner 506.

The hand state detector 504 may be configured to pre-learn a method of detecting the hand state (position) of the driver DR from the image of the interior of the vehicle using a predetermined learning method and detect the hand state (position) of the driver DR in accordance with the learned method. The learning method of the hand state detector 504 in this case may be a learning method similar to that of detection of the line of sight of the driver DR in the line-of-sight detector 502. Because a method of learning the hand state (position) of the driver DR in the hand state detector 504 can be easily understood in consideration of a manner similar to that of the method of learning the line-of-sight detection in the line-of-sight detector 502, a detailed description thereof will be omitted.

In addition to detecting the hand state (position) of the driver DR, the hand state detector 504 may also detect the hand state (position) of the fellow passenger AP and output information indicating the detected hand state (position) of the fellow passenger AP to the driving state determiner 506.

The driving state determiner 506 determines whether or not the driver DR is driving the host vehicle M on the basis of the information indicating the hand state (position) of the driver DR output by the hand state detector 504. In other words, the driving state determiner 506 determines whether the state is a driving state in which it is possible to estimate that the driver DR is performing an operation for driving the host vehicle M or a non-driving state in which it is possible to estimate that the driver DR is not performing an operation for driving the host vehicle M on the basis of a position where the hand of the driver DR is located.

For example, the driving state determiner 506 determines that the driver DR is in the driving state when the hand position of the driver DR is a position where it is estimated that the steering wheel SW is being held or that the gear shift lever is being held and operated. For example, the driving state determiner 506 determines that the driver DR is in the driving state even if a method in which the driver DR holds the steering wheel SW has been changed with respect to the hand position of the driver DR or driving is being performed in a state in which one hand of the driver DR is relaxed on a knee of the driver DR. Likewise, the driving state determiner 506 determines that the driver DR is in the driving state, for example, even if the hand position of the driver DR is a position for operating a switch for opening a door window on the driver seat DS side or the passenger seat AS side or a position for operating a switch for causing direction indicators on left and right front and rear sides of the host vehicle M to be blinked at the same time or causing a so-called hazard lamp to be turned on. Likewise, the driving state determiner 506 determines that the driver DR is in the driving state, for example, even if the hand position of the driver DR is away from the steering wheel SW to scratch his or her head or perform light stretching (for example, stretching within a predetermined time period such as within 2 seconds). In this manner, the driving state determiner 506 determines that the driver DR is in the driving state in a state in which it is estimated that the driver DR can immediately hold the steering wheel SW.

On the other hand, the driving state determiner 506 determines that the driver DR is in the non-driving state, for example, when the hand position of the driver DR is estimated to be facing the display 708 of the navigation device 700. The driving state determiner 506 determines that the driver DR is in the non-driving state, for example, even if it is estimated that the hand position of the driver DR is on the passenger seat AS side or the rear seat side or the driver DR is stretching his or her hand to the passenger seat AS side or the rear seat side. Even if the driver DR is considered to be in the driving state, the driving state determiner 506 may determine that the driver DR is in the non-driving state when a time period of this state exceeds a predetermined time period (for example, 2 seconds).

The driving state determiner 506 outputs a determination result (whether the driver DR is in the driving state or the non-driving state) as information indicating the hand state of the driver DR to the operation restrictor 510. Here, the "driving state" is an example of a "first state" in the claims, and the "non-driving state" is an example of a "second state" in the claims.

When the hand state detector 504 also detects a hand state of the fellow passenger AP and outputs information indicating a region (a position) where a hand of the fellow passenger AP is located, the driving state determiner 506 determines the hand state of the fellow passenger AP as in the case of the driver DR. For example, when it is estimated that the hand position of the fellow passenger AP is facing the display 708 of the navigation device 700, the driving state determiner 506 determines that the fellow passenger AP is operating the navigation device 700. The driving state determiner 506 also outputs information indicating the determined hand state of the fellow passenger AP to the operation restrictor 510.

The traveling state detector 508 detects whether or not the host vehicle M is in the traveling state on the basis of an output of the vehicle sensor 300. In other words, the traveling state detector 508 detects whether the state is a traveling state in which the host vehicle M is traveling or a stopped state in which the host vehicle M is stopped. For example, the traveling state detector 508 detects that the host vehicle M is in the stopped state when an output of a vehicle speed sensor included in the vehicle sensor 300 indicates that the vehicle speed of the host vehicle M is 0 and detects that the host vehicle M is in the traveling state when the output of the vehicle speed sensor indicates that the vehicle speed of the host vehicle M is a value other than 0. The traveling state detector 508 outputs information indicating the detected traveling state of the host vehicle M to the operation restrictor 510.

For example, a timing of the detection of whether or not the host vehicle M is in the traveling state in the traveling state detector 508 may not be the same as a timing of the detection of the line of sight of the driver DR in the line-of-sight detector 502 or a timing of the detection of the hand state of the driver DR in the hand state detector 504. In other words, the traveling state detector 508 may be configured to sequentially detect whether or not the host vehicle M is in the traveling state on the basis of the output of the vehicle sensor 300.

The operation restrictor 510 controls reception of an operation on the navigation device 700 to be described below. The operation restrictor 510 controls whether or not the reception of the operation on the navigation device 700 is to be restricted on the basis of information indicating a direction of the line of sight V of the driver DR output by the line-of-sight detector 502, information indicating the hand state of the driver DR output by the driving state determiner 506, and information indicating the traveling state of the host vehicle M output by the traveling state detector 508. For example, the operation restrictor 510 does not restrict the reception of the operation on the navigation device 700 when the host vehicle M is in the stopped state. For example, when the host vehicle M is in the traveling state, the operation restrictor 510 determines whether or not the reception of the operation on the navigation device 700 is to be restricted on the basis of the information indicating the direction of the line of sight V of the driver DR and the information indicating the hand state of the driver DR. At this time, the operation restrictor 510 may be configured to measure a time period using the timer, for example, from the time when the direction of the line of sight V and the hand state of the driver DR reach predetermined conditions, and restrict the reception of the operation on the navigation device 700 after the measured time period exceeds a predetermined time period (hereinafter referred to as a first predetermined time period). In FIG. 1, a configuration including a first time measurer 512 is shown as a configuration for implementing a timer function of measuring the first predetermined time period. Details of an operation related to the control of the reception of the operation on the navigation device 700 in the operation restrictor 510 will be described below.

The navigation device 700 includes, for example, a global navigation satellite system (GNSS) receiver 702, a navigation operation input 704, a navigation electronic control unit (ECU) 706, and the display 708. The navigation device 700 retains map information 710 in a storage device such as an HDD or a flash memory. The GNSS receiver 702 identifies a position of the host vehicle M on the basis of a signal received from a GNSS satellite. The position of the host vehicle M may be identified or corrected by an inertial navigation system (INS) using an output of the vehicle sensor 300.

The navigation operation input 704 receives an input operation by an occupant of the host vehicle M. The navigation operation input 704 includes buttons, keys, switches, and the like. For example, the navigation device 700 may have a function of performing reception of a television program to be watched, playback of a video of a DVD or the like, playback of music of a CD or the like, selection thereof, or the like. The navigation device 700 may have a function of performing mail-order sales via the Internet or the like, downloading music, executing an entertainment application, and the like. In this case, the navigation operation input 704 also receives an operation on the navigation device 700 by an occupant of the host vehicle M. The reception of the input operation by the occupant on the navigation operation input 704 is controlled by the operation restrictor 510 provided in the operation control device 500. The navigation operation input 704 is an example of an "operator" in the claims.

The navigation ECU 706 controls each component of the navigation device 700. For example, the navigation ECU 706 determines a route from the position of the host vehicle M identified by the GNSS receiver 702 (or any input position) to a destination input by the occupant using the navigation operation input 704 with reference to the map information 710. The map information 710 is, for example, information in which a road shape is expressed by a link indicating a road and nodes connected by a link. The map information 710 may include a curvature of a road, point of interest (POI) information, and the like. The navigation ECU 706 presents a traveling route of the host vehicle M to the occupant by causing the display 708 to display the determined route. The display 708 is, for example, a display device such as a liquid crystal display (LCD). The display 708 is an example of a "display device" in the claims. The display 708 may be a so-called touch panel in which a display function and a detection function for detecting an input operation are combined. In this case, the navigation operation input 704 may execute the detection function of the display 708. In other words, in the navigation device 700, the navigation operation input 704 and the display 708 may be integrated and configured as a navigation human machine interface (HMI). The navigation HMI of the navigation device 700 may include a speaker or the like to provide guidance on the route determined by the navigation ECU 706. When the navigation operation input 704 and the display 708 are integrated and configured as the navigation HMI in the navigation device 700, the navigation HMI is an example of an "operator including a display device" in the claims.

[Example of Process of Operation Control Device 500]

Figure 5:
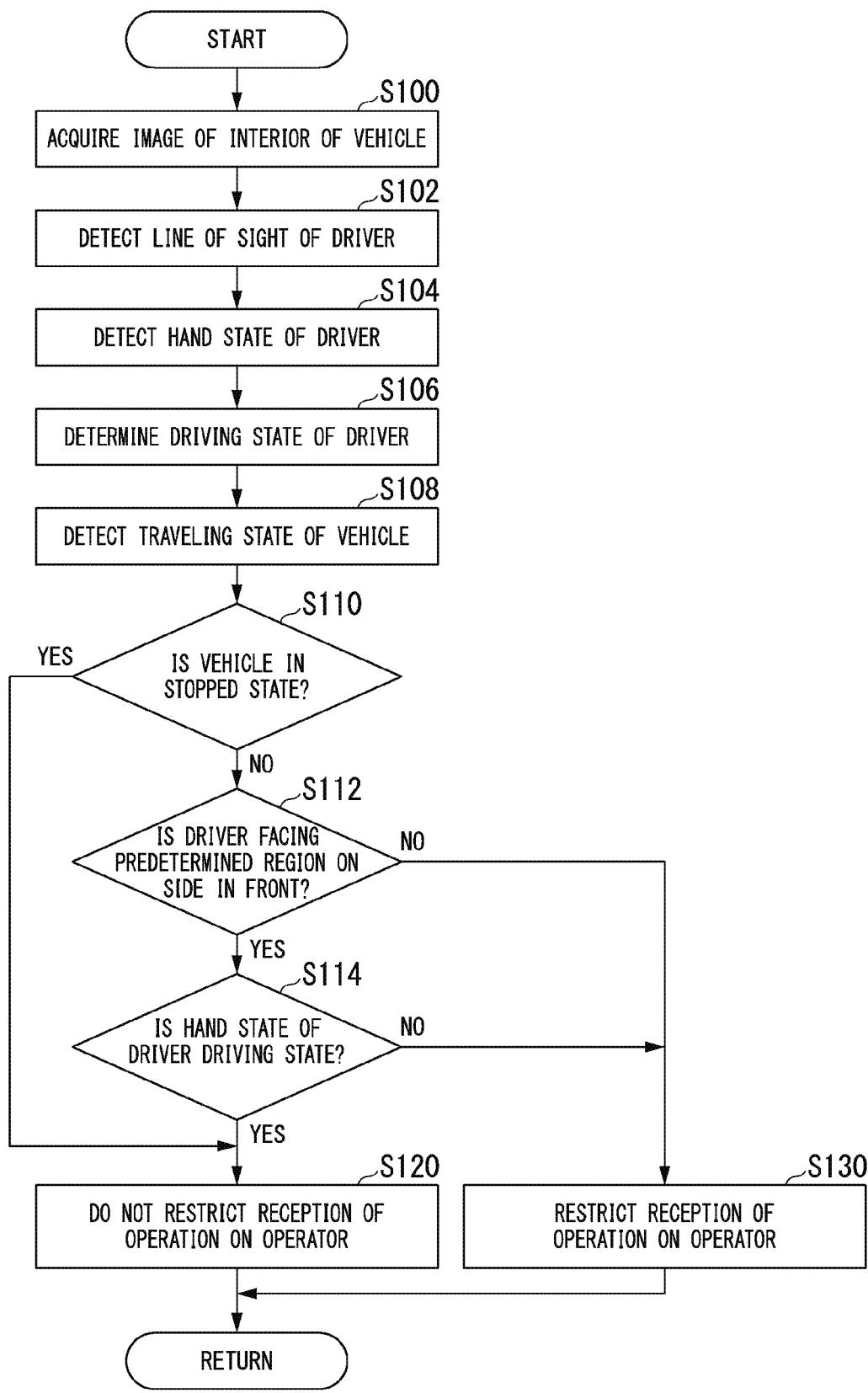
FIG. 5 is a flowchart showing an example of a flow of a process to be executed by the operation control device.

Next, a process of the operation control device 500 in the operation control system 1 will be described. FIG. 5 is a flowchart showing an example of a flow of process to be executed by the operation control device 500. In the following description, it is assumed that the navigation device 700 is configured as the navigation HMI in which the navigation operation input 704 and the display 708 are integrated. It is assumed that the operation control device 500 designates an operation (a touch operation) on an operation button or the like displayed on the display 708 constituting the navigation HMI as an operation on the operator of the navigation device 700 to control the reception of the operation. The process of the present flowchart is iteratively executed at predetermined time intervals at which the camera 100 captures an image of the interior of the host vehicle M. In the following description, for example, it is assumed that a configuration in which the detection of whether or not the host vehicle M is in the traveling state in the traveling state detector 508 is performed at the same timing as the detection of the line of sight of the driver DR in the line-of-sight detector 502 or the detection of the hand state of the driver DR in the hand state detector 504 is adopted.

When the camera 100 captures an image of the interior of the host vehicle M, the operation control device 500 acquires an image of the interior of the host vehicle M (step S100).

Next, the line-of-sight detector 502 detects a direction of the line of sight V of the driver DR shown in the acquired image of the interior of the host vehicle M (step S102). The line-of-sight detector 502 outputs information indicating the detected direction of the line of sight V of the driver DR to the operation restrictor 510.

Next, the hand state detector 504 detects a hand state (position) of the driver DR shown in the acquired image of the interior of the host vehicle M (step S104). The hand state detector 504 outputs information indicating the detected hand state (position) of the driver DR to the driving state determiner 506.

Next, the driving state determiner 506 determines the driving state of the driver DR (whether the driver DR is in the driving state or the non-driving state) on the basis of information indicating the hand state (position) of the driver DR output by the hand state detector 504 (step S106). The driving state determiner 506 outputs a determined result as information indicating the hand state of the driver DR to the operation restrictor 510.

Next, the traveling state detector 508 detects the traveling state of the host vehicle M on the basis of an output of the vehicle sensor 300 (step S108). The traveling state detector 508 outputs information indicating the detected traveling state of the host vehicle M to the operation restrictor 510.

In FIG. 5, the processing of step S102 in the line-of-sight detector 502, the processing of step S104 in the hand state detector 504, the processing of step S106 in the driving state determiner 506, and the processing of step S108 in the traveling state detector 508 are sequentially shown. However, the processing in the line-of-sight detector 502, the hand state detector 504, the driving state determiner 506, and the traveling state detector 508 may be performed during the same period. In other words, the processing of step S102 in the line-of-sight detector 502, the processing of step S104 in the hand state detector 504, the processing of step S106 in the driving state determiner 506, and the processing of step S108 in the traveling state detector 508 may be performed in parallel. Accordingly, the order of the processing in the line-of-sight detector 502, the hand state detector 504, the driving state determiner 506, and the traveling state detector 508 is not limited to the order shown in the flowchart shown in FIG. 5. Thus, information indicating the direction of the line of sight V of the driver DR output by the line-of-sight detector 502, information indicating the hand state of the driver DR output by the driving state determiner 506, and information indicating the traveling state of the host vehicle M output by the traveling state detector 508 are input to the operation restrictor 510 during the same period.

Next, the operation restrictor 510 determines whether or not the host vehicle M is in the stopped state on the basis of the information indicating the traveling state of the host vehicle M output by the traveling state detector 508 (step S110). When it is determined that the host vehicle M is in the stopped state in step S110, the operation restrictor 510 does not restrict the reception of the operation on the operator of the navigation device 700 (step S120). The operation restrictor 510 ends the process of the present flowchart on an image of the interior of the host vehicle M currently acquired from the camera 100.

On the other hand, when it is determined that the host vehicle M is not in the stopped state, i.e., when it is determined that the host vehicle M is in the traveling state, in step S110, the operation restrictor 510 determines whether or not the driver DR is facing a predetermined region on the side in front on the basis of the information indicating the direction of the line of sight V of the driver DR output by the line-of-sight detector 502 (step S112). Here, the "predetermined region on the side in front" includes at least a region of a part or all of the front windshield 10 of the host vehicle M and a region near the side mirror 14 or the side mirror 16. For example, the line-of-sight determination region RFW, the line-of-sight determination region RRM, the line-of-sight determination region RSMR, and the line-of-sight determination region RSML shown in FIG. 3 are included. The "predetermined region on the side in front" may include, for example, the line-of-sight determination region RGR shown in FIG. 3. In other words, the "predetermined region on the side in front" is a region where it can be estimated that the driver DR is performing an operation for driving the host vehicle M. Furthermore, in other words, the "predetermined region on the side in front" may be a region other than a region where it can be estimated that the driver DR is performing an operation on the navigation device 700 (for example, the line-of-sight determination region RDP shown in FIG. 3).

When it is determined that the driver DR is facing the predetermined region on the side in front in step S112, the operation restrictor 510 determines whether or not the hand state of the driver DR is the driving state on the basis of information indicating the hand state of the driver DR output by the driving state determiner 506 (step S114). When it is determined that the hand state of the driver DR is the driving state in step S114, the operation restrictor 510 moves the process to step S120 and ends the process of the present flowchart on the image of the interior of the host vehicle M currently acquired from the camera 100 without restricting the reception of the operation on the operator of the navigation device 700.

On the other hand, when it is determined that the driver DR is not facing the predetermined region on the side in front in step S112 or when it is determined that the hand state of the driver DR is not the driving state, i.e., the hand state of the driver DR is the non-driving state, in step S114, the operation restrictor 510 restricts the reception of the operation on the operator of the navigation device 700 (step S130). The operation restrictor 510 ends the process of the present flowchart on the image of the interior of the host vehicle M currently acquired from the camera 100.

As described above, information indicating the direction of the line of sight V of the driver DR output by the line-of-sight detector 502 and information indicating the hand state of the driver DR output by the driving state determiner 506 are input to the operation restrictor 510 during the same period. Thus, the operation restrictor 510 may perform the processing of step S112 and the processing of step S114 shown in FIG. 5 in the reverse order. In other words, the operation restrictor 510 may first determine whether or not the hand state of the driver DR is the driving state and subsequently determine whether or not the driver DR is facing the predetermined region on the side in front.

According to the above processing, the operation control device 500 determines the state of the driver DR on the basis of the image of the interior of the host vehicle M captured by the camera 100 and controls the reception of the operation on the navigation device 700 on the basis of the determined state of the driver DR. Thereby, for example, because it is estimated that the host vehicle M can be accurately driven if the driver DR is facing the predetermined region on the side in front and the hand state is the driving state, the operation control device 500 does not restrict the reception of the operation on the navigation device 700 by the fellow passenger AP. That is, the operation control device 500 allows an input operation on the navigation device 700 by the fellow passenger AP who is not involved in the driving of the host vehicle M. For example, the operation control device 500 allows the fellow passenger AP to perform a channel selection operation so that a channel of a television program to be watched through the navigation device 700 is changed. Thereby, the host vehicle M in which the operation control system 1 including the operation control device 500 is mounted can improve the convenience for an occupant who is not involved in the driving of the host vehicle M.

For example, a case in which the driver DR is hidden by a hand or arm of the fellow passenger AP when the fellow passenger AP operates the navigation device 700 is conceivable if the camera 100 is arranged at a position between the display 708 and the center console 18 as shown in FIG. 2. That is, a case in which so-called occlusion in which a part or all of a photographing range in which the camera 100 photographs the interior of the host vehicle M is blocked by the hand or arm of the fellow passenger AP occurs is conceivable.

Figure 6:
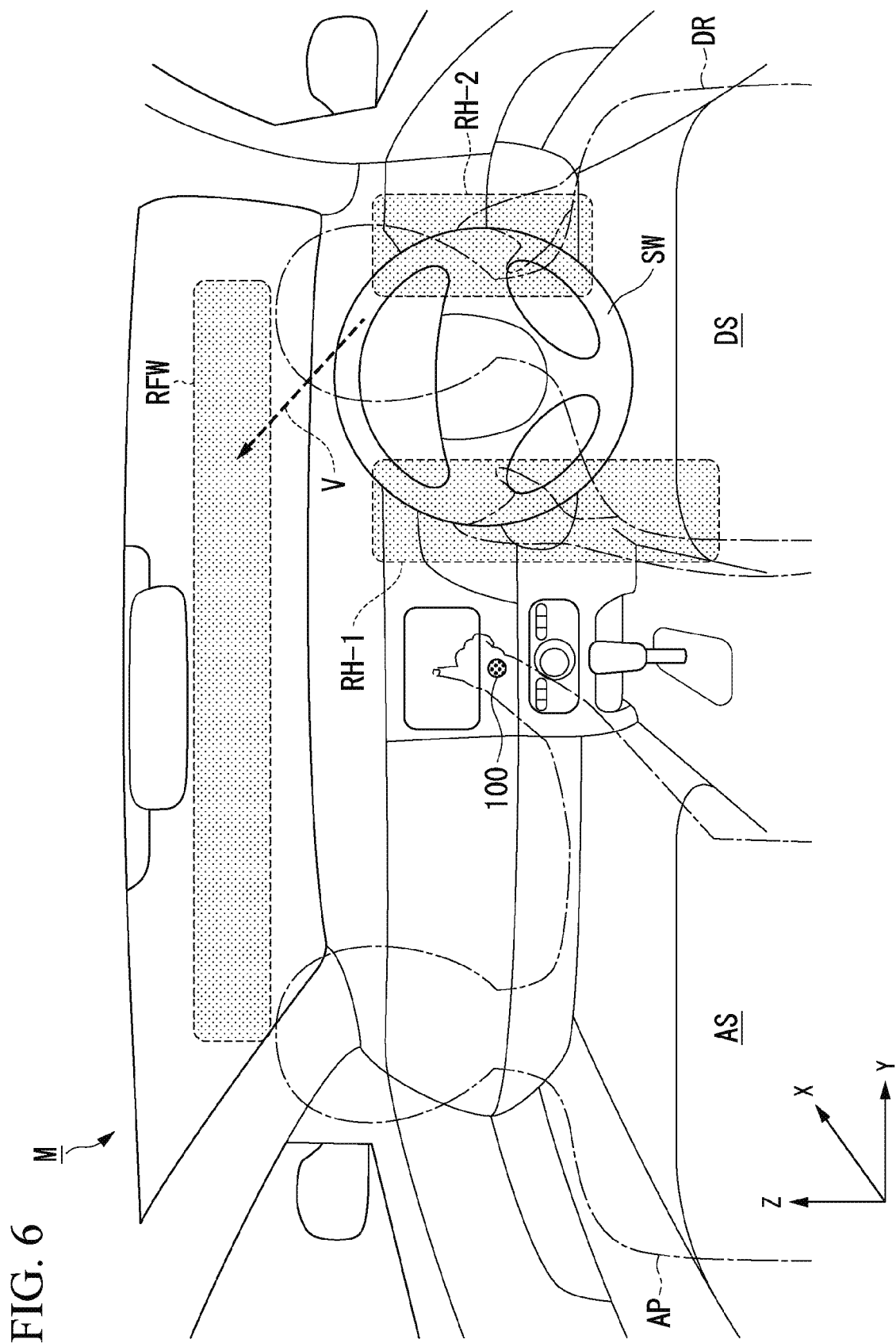
FIG. 6 is a diagram showing an example of a case in which a photographing range of the camera constituting the operation control system is blocked.

FIG. 6 is a diagram showing an example of a case in which the photographing range of the camera 100 constituting the operation control system 1 is blocked. In FIG. 6, an example in which occlusion has occurred due to the right hand or right arm of the fellow passenger AP when the driver DR is facing a predetermined region on the side in front (the line of sight V intersects the line-of-sight determination region RFW of the front windshield 10), the driver DR's left hand (including his or her left arm) is at a position of the region RH-1 including the region of the steering wheel SW, and the driver DR's right hand is at a position of the region RH-2 including the region of the steering wheel SW is shown. When occlusion occurs, a detection-disabled state in which detection of one of the direction of the line of sight V of the driver DR and the hand state of the driver DR is disabled is conceivable. The "detection-disabled state" is an example of a "third state" in the claims. When such a detection-disabled state is reached, the reception of the operation on the operator of the navigation device 700 is restricted in accordance with the determination of either step S112 or step S114 in the operation restrictor 510 in the flowchart of the operation control device 500 shown in FIG. 5. However, as shown in FIG. 6, a case in which the driver DR is accurately driving the host vehicle M even if the detection-disabled state is reached is also conceivable. In this case, as described above, the operation restrictor 510 may be configured to restrict the reception of the operation on the navigation device 700 after the time period measured by the first time measurer 512 exceeds the first predetermined time period (for example, 2 to 5 seconds or the like).

[Another Example of Process of Operation Control Device 500]

Figure 7:
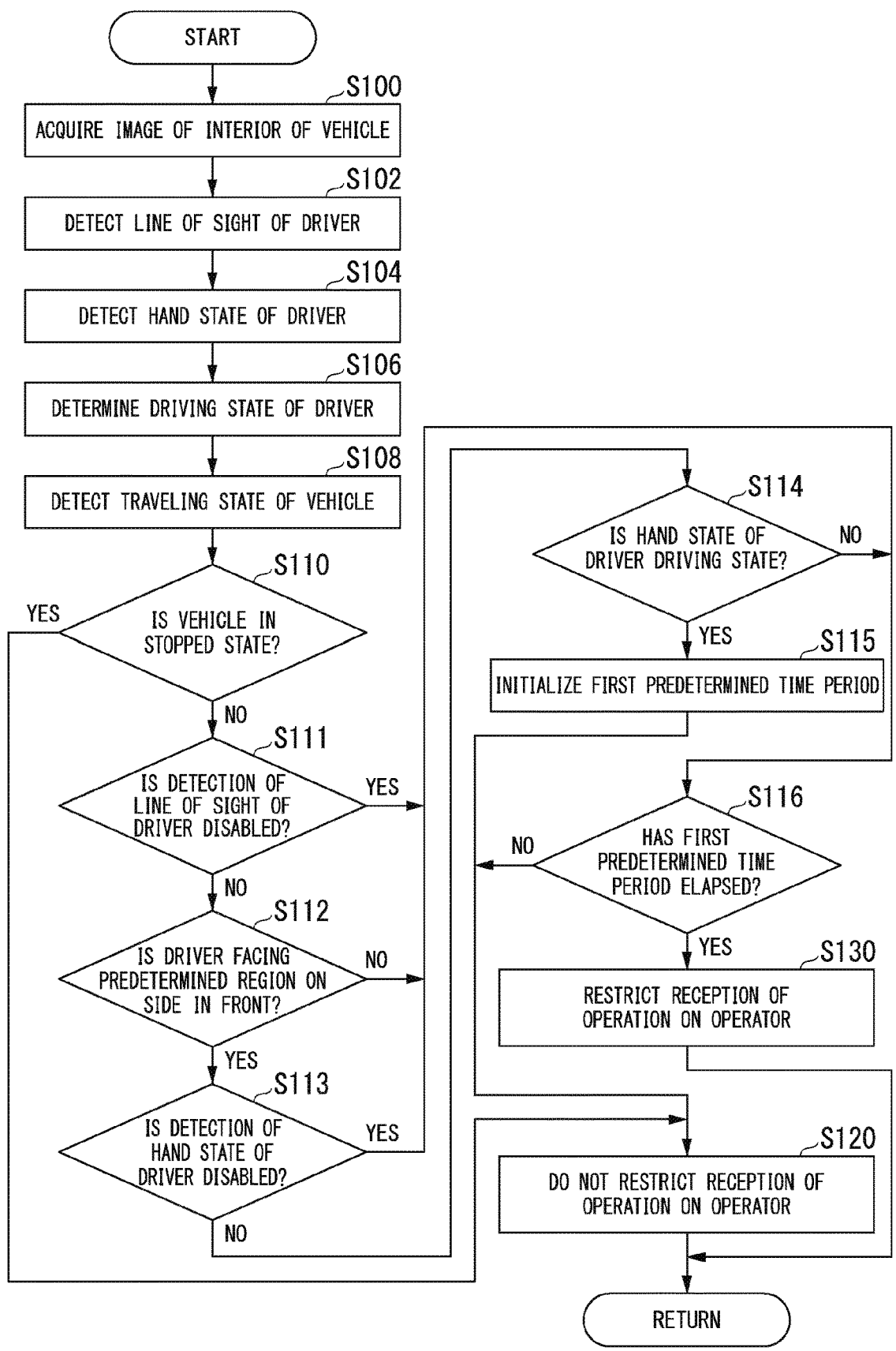
FIG. 7 is a flowchart showing an example of a flow of a process to be executed by the operation control device when the photographing range of the camera constituting the operation control system has been blocked.

Next, another process of the operation control device 500 in the operation control system 1 will be described. FIG. 7 is a flowchart showing an example of a flow of a process to be executed by the operation control device 500 when the photographing range of the camera 100 constituting the operation control system 1 is blocked. In the following description, it is assumed that the navigation device 700 is configured as a navigation HMI in which the navigation operation input 704 and the display 708 are integrated. It is assumed that the operation control device 500 designates an operation (a touch operation) on an operation button or the like displayed on the display 708 constituting the navigation HMI as an operation on the operator of the navigation device 700 to control the reception of the operation. The process of the present flowchart is iteratively executed at predetermined time intervals at which the camera 100 captures an image of the interior of the host vehicle M.

The flowchart shown in FIG. 7 includes a process similar to that of the flowchart shown in FIG. 5. More specifically, the processing of steps S100 to S110 and S120 in the flowchart shown in FIG. 7 is similar to the processing of the corresponding step numbers in the flowchart shown in FIG. 5. Therefore, in the following description, description of processing similar to that of the flowchart shown in FIG. 5 will be omitted and processing different from that of the flowchart shown in FIG. 5 will be described.

When it is determined that the host vehicle M is not in the stopped state (the host vehicle M is in the traveling state) in step S110, the operation restrictor 510 determines whether or not the detection of the line of sight V of the driver DR is disabled on the basis of information indicating the direction of the line of sight V of the driver DR output by the line-of-sight detector 502 (step S111). The determination in step S111 may be made according to, for example, whether or not the line-of-sight determination region determined to intersect the line of sight V of the driver DR is shown in the information indicating the direction of the line of sight V of the driver DR output by the line-of-sight detector 502.

When it is determined that the detection of the line of sight V of the driver DR is not disabled, i.e., the direction of the line of sight V of the driver DR has been detected, in step S111, the operation restrictor 510 determines whether or not the driver DR is facing the predetermined region on the side in front on the basis of the information indicating the direction of the line of sight V of the driver DR output by the line-of-sight detector 502 (step S112).

When it is determined that the driver DR is facing the predetermined region on the side in front in step S112, the operation restrictor 510 determines whether or not detection of the hand state of the driver DR is disabled on the basis of the information indicating the hand state of the driver DR output by the driving state determiner 506 (step S113). The determination in step S113 can be made according to, for example, whether or not a determination result of the driving state determiner 506 (whether the driver DR is in the driving state or the non-driving state) is shown in the information indicating the hand state of the driver DR output by the driving state determiner 506. The operation restrictor 510 may make the determination in step S113, according to, for example, whether or not the hand state (position) of the driver DR is shown in the information indicating the hand state (position) of the driver DR output by the hand state detector 504. In this case, for example, when the detection of the hand position of the driver DR is disabled, but it is possible to estimate that the hand state of the driver DR is the driving state from the position or direction of the arm of the driver DR, it is possible to prevent determining disabling of detection of the hand state of the driver DR in step S113.

When it is determined that the detection of the hand state of the driver DR is not disabled, i.e., that the hand state of the driver DR can be detected, in step S113, the operation restrictor 510 determines whether or not the hand state of the driver DR is the driving state on the basis of the information indicating the hand state of the driver DR output by the driving state determiner 506 (step S114).

When it is determined that the hand state of the driver DR is the driving state in step S114, the operation restrictor 510 initializes a time period (the first predetermined time period) measured by the first time measurer 512 according to a process to be described below (step S115). In other words, the operation restrictor 510 initializes the time period (the first predetermined time period) measured by the first time measurer 512 at a point in time when the driver DR is facing the predetermined region on the side in front and the hand state of the driver DR is the driving state after the detection-disabled state is lost. The operation restrictor 510 moves the process to step S120 and ends the process of the present flowchart on the image of the interior of the host vehicle M currently acquired from the camera 100 without restricting the reception of the operation on the operator of the navigation device 700.

On the other hand, when it is determined that the detection of the line of sight V of the driver DR is disabled in step S111, when it is determined that the driver DR is not facing the predetermined region on the side in front in step S112, when it is determined that the detection of the hand state of the driver DR is disabled in step S113, or when it is determined that the hand state of the driver DR is not the driving state (the hand state of the driver DR is the non-driving state) in step S114, the operation restrictor 510 causes the first time measurer 512 to start the measurement of the time period (the first predetermined time period). The operation restrictor 510 determines whether or not the time period measured by the first time measurer 512 has exceeded the first predetermined time period (step S116).

When it is determined that the time period measured by the first time measurer 512 has not exceeded the first predetermined time period in step S116, the operation restrictor 510 moves the process to step S120 and ends the process of the present flowchart on the image of the interior of the host vehicle M currently acquired from the camera 100 without restricting the reception of the operation on the operator of the navigation device 700.

On the other hand, when it is determined that the time period measured by the first time measurer 512 has exceeded the first predetermined time period in step S116, the operation restrictor 510 restricts the reception of the operation on the operator of the navigation device 700 (step S130). The operation restrictor 510 ends the process of the present flowchart on the image of the interior of the host vehicle M currently acquired from the camera 100.

As described above, information indicating the direction of the line of sight V of the driver DR output by the line-of-sight detector 502 and information indicating the hand state of the driver DR output by the driving state determiner 506 are input to the operation restrictor 510 during the same period. Thus, the operation restrictor 510 may perform the processing set of steps S111 and S112 and the processing set of steps S113 and S114 shown in FIG. 7 in the reverse order as in the flowchart shown in FIG. 5. In other words, the operation restrictor 510 may first determine whether or not the detection of the hand state of the driver DR is disabled and subsequently determine whether or not the detection of the line of sight V of the driver DR is disabled.

For example, according to the above processing, the operation control device 500 measures a time period during which the detection-disabled state continues from a point in time when occlusion occurs in the photographing range in which the camera 100 photographs the interior of the host vehicle M due to the fellow passenger AP operating the navigation device 700 and the detection of one of the direction of the line of sight V of the driver DR and the hand state of the driver DR is disabled (the state becomes the detection-disabled state). The operation control device 500 maintains (continues) a state in which an input operation on the navigation device 700 is allowed before the time period during which the detection-disabled state continues exceeds the first predetermined time period. Thereby, the host vehicle M in which the operation control system 1 including the operation control device 500 is mounted can improve the convenience for an occupant who is not involved in the driving of the host vehicle M before the first predetermined time period elapses without immediately restricting the reception of the operation on the operator of the navigation device 700 even if it is not possible to determine whether or not the driver DR is accurately driving the host vehicle M.

When the detection-disabled state has been eliminated, the operation restrictor 510 initializes the time period (the first predetermined time period) measured by the first time measurer 512 in step S115. Thereby, it is possible to avoid an immediate restriction on the reception of the operation on the operator of the navigation device 700 when the detection-disabled state will be reached next time in the host vehicle M in which the operation control system 1 including the operation control device 500 is mounted. In other words, it is possible to prevent the convenience for an occupant who is not involved in the driving of the host vehicle M from being degraded before the first predetermined time period elapses.

As described above, according to the operation control device 500 of the first embodiment, the state of the driver DR is determined on the basis of the image of the interior of the host vehicle M captured by the camera 100 and the reception of the operation on the navigation device 700 is controlled on the basis of the determined state of the driver DR. Thereby, the operation control device 500 of the first embodiment can allow an input operation on the navigation device 700, for example, by the fellow passenger AP or the like who is not involved in the driving of the host vehicle M, as long as it is possible to estimate that the driver DR is accurately driving the host vehicle M. Thereby, the host vehicle M in which the operation control system 1 including the operation control device 500 of the first embodiment is mounted can improve the convenience for an occupant who is not involved in the driving of the host vehicle M.

Moreover, the operation control device 500 of the first embodiment detects the hand state of the driver DR for determining the state of the driver DR on the basis of the image of the interior of the host vehicle M captured by the camera 100. Thus, the operation control device 500 of the first embodiment can determine that the driver DR is in the driving state if it is estimated that the driver DR can immediately hold the steering wheel SW. For example, a case in which the driving state can be determined as described above may have an advantage in that it is possible to eliminate unnecessary control as compared with a case in which the hand state of the driver DR is determined by a contact sensor provided on the steering wheel SW. This is because the contact sensor determines whether or not the steering wheel SW is being held and therefore the driver DR is determined to be in a non-driving state if the steering wheel SW is not held for a short time. Also, this is because, if the driver DR is determined to be in the non-driving state for a short time when the steering wheel SW is not held, the input operation on the navigation device 700 is restricted more than necessary.

The operation control device 500 of the first embodiment causes the first time measurer 512 to start the measurement of the time period (the first predetermined time period) when it is determined that the detection of the line of sight V of the driver DR is disabled in step S111, when it is determined that the driver DR is not facing the predetermined region on the side in front in step S112, when it is determined that the detection of the hand state of the driver DR is disabled in step S113, or when it is determined that the hand state of the driver DR is not the driving state (the hand state of the driver DR is the non-driving state) in step S114. The operation control device 500 of the first embodiment determines whether or not the time period measured by the first time measurer 512 has exceeded the first predetermined time period in step S116 and restricts the reception of the operation on the operator of the navigation device 700. In other words, for example, the time period until the reception of the operation on the operator of the navigation device 700 is restricted is the same between a case in which the detection of the line of sight V of the driver DR is disabled and a case in which the detection of the hand state of the driver DR is disabled. However, for example, a case in which a degree of importance of the detection of the line of sight V of the driver DR being disabled is made to be higher when a degree of importance of the line of sight V of the driver DR is compared with that of the hand state of the driver DR in a state when the host vehicle M is driven is also conceivable. In this case, for example, another timer function similar to that of the first time measurer 512 may be provided in the operation restrictor 510, and the time period until the reception of the operation on the operator of the navigation device 700 is restricted may be different between a case in which the detection of the line of sight V of the driver DR is disabled and a case in which the detection of the hand state of the driver DR is disabled. For example, the reception of the operation on the operator of the navigation device 700 may be restricted after the passage of two seconds when the detection of the line of sight V of the driver DR is disabled and the reception of the operation on the operator of the navigation device 700 may be restricted after the passage of four seconds when the detection of the hand state of the driver DR is disabled. The process of the operation control device 500 in this case can be easily understood in consideration of a similar manner on the basis of the flowchart shown in FIG. 7. Accordingly, a detailed description of the process of the operation control device 500 in this case will be omitted.

Second Embodiment

[Example of Overall Configuration of Operation Control System 2]

Figure 8:
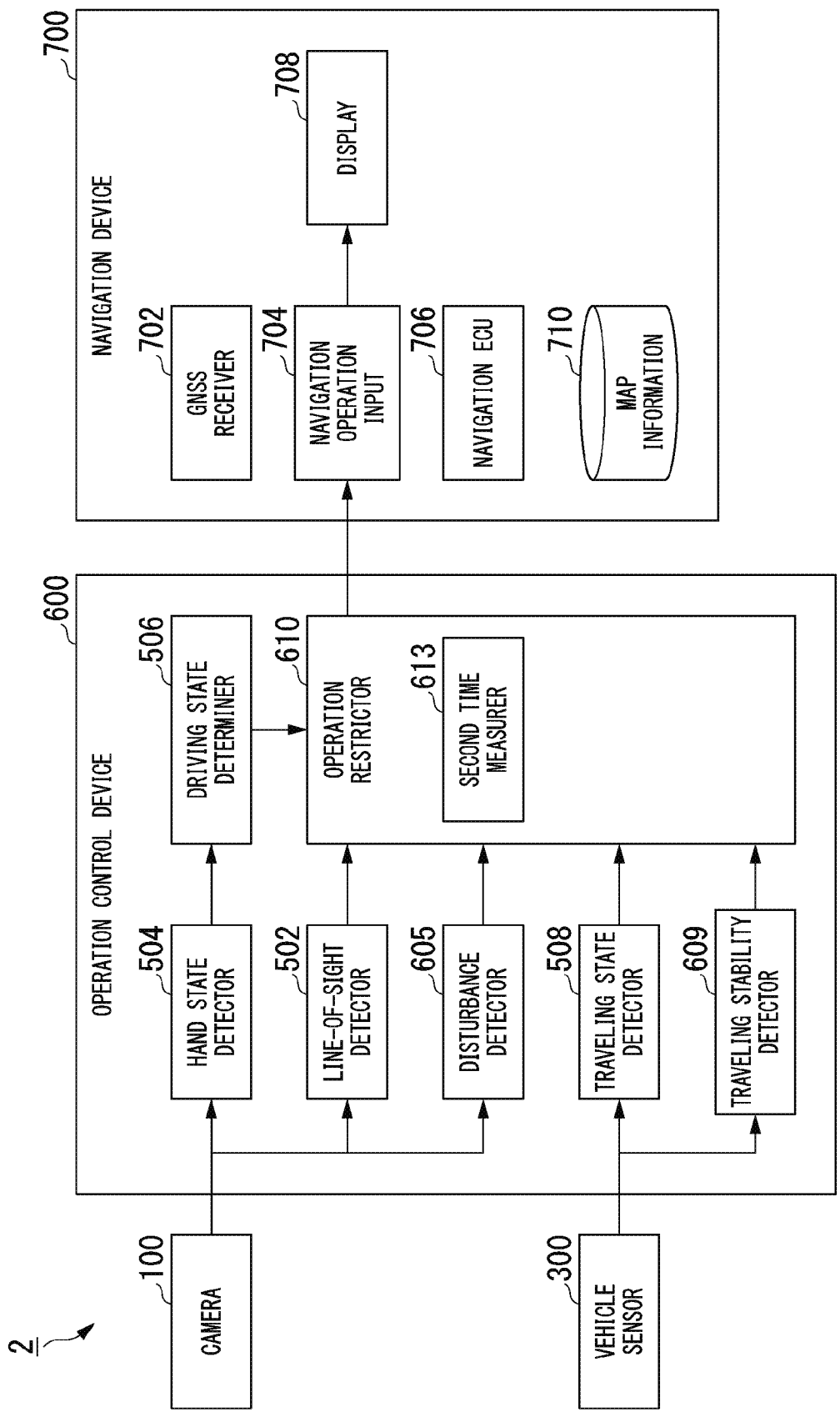
FIG. 8 is a schematic configuration diagram of an operation control system including an operation control device according to a second embodiment.

A second embodiment will be described below. FIG. 8 is a schematic configuration diagram of an operation control system 2 including an operation control device 600 according to the second embodiment. The operation control system 2 includes, for example, a camera 100, a vehicle sensor 300, the operation control device 600, and a navigation device 700. In the operation control system 2, the operation control device 500 in the operation control system 1 of the first embodiment is replaced with the operation control device 600. In the following description, components similar to those of the operation control system 1 of the first embodiment among the components provided in the operation control system 2 are denoted by the same reference signs and detailed description of the components will be omitted.

The operation control device 600 includes, for example, a line-of-sight detector 502, a hand state detector 504, a disturbance detector 605, a driving state determiner 506, a traveling state detector 508, a traveling stability detector 609, and an operation restrictor 610. As in the operation control device 500, these components include, for example, a hardware processor such as a CPU and a storage device (a storage device including a non-transitory storage medium) storing a program (software) and the function of each component is implemented by the processor executing the program. Some or all of these components provided in the operation control device 600 may be implemented, for example, by hardware (a circuit including circuitry) such as an LSI circuit, an ASIC, an FPGA, or a GPU or may be implemented by software and hardware in cooperation. Functions of some or all of these components provided in the operation control device 600 may be implemented by a dedicated LSI circuit. Here, the program (software) may be pre-stored in a storage device (a storage device including a non-transitory storage medium) such as a ROM, a RAM, an HDD, or a flash memory or may be stored in a removable storage medium (a non-transitory storage medium) such as a DVD or a CD-ROM and installed in the storage device when the storage medium is mounted on a drive device. The program (software) may be pre-downloaded from another computer device through short-range communication or wide-region communication and installed in the storage device. The operation control device 600 is also an example of an "operation control device" in the claims.

In the operation control device 600, the disturbance detector 605 and the traveling stability detector 609 are added to the operation control device 500 provided in the operation control system 1 of the first embodiment. In the operation control device 600, the operation restrictor 510 provided in the operation control device 500 provided in the operation control system 1 of the first embodiment is replaced with the operation restrictor 610. In the following description, components similar to those of the operation control device 500 provided in the operation control system 1 of the first embodiment among the components provided in the operation control device 600 are denoted by the same reference signs and detailed description of the components will be omitted. In the following description, a configuration, an operation, and a process of the operation control device 600 that is a component different from the operation control device 500 provided in the operation control system 1 of the first embodiment will be described.

The disturbance detector 605 detects a disturbed state in which the detection of one or both of a direction of a line of sight V of a driver DR and a hand state of the driver DR is disabled due to disturbance on the basis of an image of the interior of a host vehicle M output by the camera 100. For example, the disturbance may be caused by an occupant of the host vehicle M other than the driver DR such as a fellow passenger AP, a primary factor other than the driver DR, or the like. Here, as the primary factor other than the driver DR that causes the disturbed state, for example, a case in which it is not possible to recognize the driver DR shown in the image of the interior of the host vehicle M captured by the camera 100 when strong light enters from the rear of the host vehicle M or the interior of the host vehicle M becomes extremely dark or the like is conceivable. When the disturbed state is detected, the disturbance detector 605 outputs information indicating the detection of the disturbed state to the operation restrictor 610. The "disturbed state" is an example of a "fourth state" in the claims.

For example, it is possible to perform detection in accordance with content learned using a predetermined learning method for the detection of the disturbed state of the disturbance detector 605 when the disturbance is caused by an occupant of the host vehicle M other than the driver DR, as in the detection of the line of sight of the driver DR in the line-of-sight detector 502 or the detection the hand state of the driver DR in the hand state detector 504. In the detection of the disturbed state in the disturbance detector 605 when the disturbance is caused by a primary factor other than the driver DR (for example, a case in which the driver DR cannot be recognized from the image of the interior of the host vehicle M captured by the camera 100 or the like), the detection can be performed according to the image of the interior of the host vehicle M output by the camera 100 or the state of exposure control when the camera 100 performs photographing.

For example, the detection of the disturbed state in the disturbance detector 605 may not be performed at the same timing as the detection of the line of sight of the driver DR in the line-of-sight detector 502 or the detection of the hand state of the driver DR in the hand state detector 504. In other words, the disturbance detector 605 may be configured to sequentially perform the detection of the disturbed state.

The traveling stability detector 609 detects the stability of the traveling state of the host vehicle M on the basis of an output of the vehicle sensor 300. The stability of the traveling state can be detected on the basis of a change in the output of the vehicle sensor 300, an amount of change therein, or the like. For example, the traveling stability detector 609 detects that the traveling state of the host vehicle M is stable when the amount of change in an output of the vehicle speed sensor or the acceleration sensor included in the vehicle sensor 300 (including an amount of change on the acceleration side and an amount of change on the deceleration side in the host vehicle M) is less than a threshold value of a predetermined amount of change related to the speed and detects that the traveling state of the host vehicle M is not stable when the amount of change in the output of the vehicle speed sensor or the acceleration sensor included in the vehicle sensor 300 is greater than or equal to the threshold value of the predetermined amount of change related to the speed. For example, the traveling stability detector 609 detects that the traveling state of the host vehicle M is stable when the amount of change in an output of the yaw rate sensor or the direction sensor included in the vehicle sensor 300 (including a change that is assumed when the host vehicle M is traveling straight ahead) is less than a threshold value of a predetermined amount of change related to steering and detects that the traveling state of the host vehicle M is not stable when the amount of change in the output of the yaw rate sensor or the direction sensor included in the vehicle sensor 300 is greater than or equal to the threshold value of the predetermined amount of change related to the steering. The traveling state detector 508 outputs information indicating the detected stability of the traveling state of the host vehicle M to the operation restrictor 610.

For example, the detection of stability of the traveling state of the host vehicle M in the traveling stability detector 609 may not be performed at the same timing as the detection of the line of sight of the driver DR in the line-of-sight detector 502 or the detection of the hand state of the driver DR in the hand state detector 504. In other words, the traveling stability detector 609 may be configured to sequentially perform the detection of the stability of the traveling state of the host vehicle M on the basis of an output of the vehicle sensor 300.

Similar to the operation restrictor 510 provided in the operation control device 500 in the first embodiment, the operation restrictor 610 controls reception of an operation on the navigation device 700. In this regard, the operation restrictor 610 controls whether or not the reception of the operation on the navigation device 700 is to be restricted together with information indicating that the disturbed state output by the disturbance detector 605 has been detected and information indicating the stability of the traveling state of the host vehicle M output by the traveling stability detector 609 in addition to information used by the operation restrictor 510 in the first embodiment. For example, if the host vehicle M is in the traveling state, the operation restrictor 610 determines whether or not the reception of the operation on the navigation device 700 is to be restricted on the basis of the information indicating the stability of the traveling state of the host vehicle M when the disturbed state has been detected. Even if it is determined that the reception of the operation on the navigation device 700 is not to be restricted, the operation restrictor 610 measures a time period using, for example, a timer, from the time when the disturbed state is detected and restricts the reception of the operation on the navigation device 700 after the measured time period exceeds a predetermined time period (hereinafter referred to as a second predetermined time period). In FIG. 8, a configuration including a second time measurer 613 as a configuration in which a timer function of measuring the second predetermined time period is implemented is shown.

[Example of Process of Operation Control Device 600]

Figure 9:
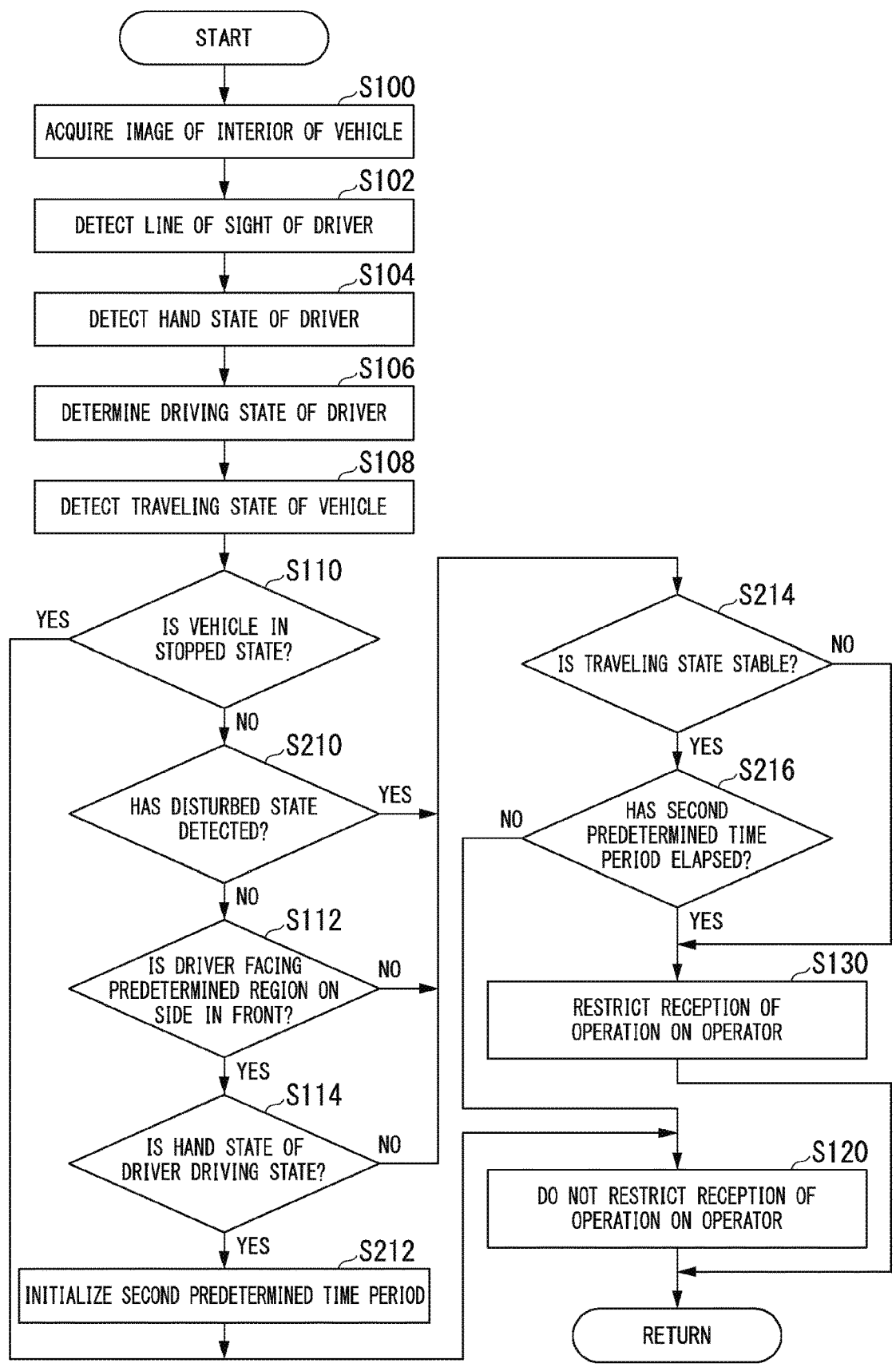
FIG. 9 is a flowchart showing an example of a flow of a process to be executed by the operation control device.

Next, a process of the operation control device 600 in the operation control system 2 will be described. FIG. 9 is a flowchart showing an example of a flow of the process to be executed by the operation control device 600. In the following description, it is also assumed that the navigation device 700 is configured as a navigation HMI in which a navigation operation input 704 and a display 708 are integrated. It is assumed that the operation control device 600 designates an operation (a touch operation) on an operation button or the like displayed on the display 708 constituting the navigation HMI as an operation on the operator of the navigation device 700 to control the reception of the operation. The process of the present flowchart is iteratively executed at predetermined time intervals at which the camera 100 captures an image of the interior of the host vehicle M. In the following description, for example, the detection of whether or not the host vehicle M is in the traveling state in the traveling state detector 508 is performed at the same timing as the detection of the line of sight of the driver DR in the line-of-sight detector 502 or the detection of the hand state of the driver DR in the hand state detector 504, but a configuration in which the detection of the disturbed state in the disturbance detector 605 and the detection of the stability of the traveling state of the host vehicle M in the traveling stability detector 609 are sequentially performed is assumed to be adopted.

The flowchart shown in FIG. 9 includes a process similar to that of the flowchart showing the example of the process of the operation control device 500 of the first embodiment shown in FIG. 5 or 7. More specifically, the processing of steps S100 to S110 and S120 in the flowchart shown in FIG. 9 is the same as the processing of the corresponding step numbers in the flowchart shown in FIG. 5 or 7. Accordingly, in the following description, description of processing similar to that of the flowcharts shown in FIG. 5 or 7 will be omitted and processing different from that of the flowchart shown in FIG. 5 or 7 will be described.

The operation restrictor 610 determines whether or not the host vehicle M is in a stopped state on the basis of information indicating the traveling state of the host vehicle M output by the traveling state detector 508 (step S110). When it is determined that the host vehicle M is in the stopped state in step S110, the operation restrictor 610 does not restrict the reception of the operation on the operator of the navigation device 700 (step S120). The operation restrictor 610 ends the process of the present flowchart on the image of the interior of the host vehicle M currently acquired from the camera 100.

On the other hand, when it is determined that the host vehicle M is not in the stopped state (the host vehicle M is in the traveling state) in step S110, the operation restrictor 610 determines whether or not the disturbed state has been detected on the basis of the information output by the disturbance detector 605 (step S210).

When it is determined that the disturbed state has not been detected in step S210, the operation restrictor 610 determines whether or not the driver DR is facing a predetermined region on the side in front on the basis of information indicating the direction of the line of sight V of the driver DR output by the line-of-sight detector 502 (step S112).

When it is determined that the driver DR is facing the predetermined region on the side in front in step S112, the operation restrictor 610 determines whether or not the hand state of the driver DR is the driving state on the basis of information indicating the hand state of the driver DR output by the driving state determiner 506 (step S114).

When it is determined that the hand state of the driver DR is the driving state in step S114, the operation restrictor 610 initializes a time period (the second predetermined time period) measured by the second time measurer 613 according to a process to be described below (step S212). In other words, when the driver DR is facing the predetermined region on the side in front and the hand state of the driver DR is the driving state after the disturbed state is no longer detected, the operation restrictor 610 initializes the time period (the second predetermined time period) measured by the second time measurer 613 at this point in time. The operation restrictor 610 moves the process to step S120 and ends the process of the present flowchart on the image of the interior of the host vehicle M currently acquired from the camera 100 without restricting the reception of the operation on the operator of the navigation device 700.

In the operation control device 600, as in the operation control device 500 of the first embodiment, the processing of step S102 in the line-of-sight detector 502, the processing of step S104 in the hand state detector 504, the processing of step S106 in the driving state determiner 506, and the processing of step S108 in the traveling state detector 508 may also be performed in parallel. Thus, information indicating the direction of the line of sight V of the driver DR output by the line-of-sight detector 502 and information indicating the hand state of the driver DR output by the driving state determiner 506 are also input to the operation restrictor 610 during the same period. Accordingly, the operation restrictor 610 may also perform the processing of step S112 and the processing of step S114 shown in FIG. 9 in the reverse order in consideration of a manner similar to that of the flowchart of the process of the operation control device 500 of the first embodiment shown in FIG. 5 or 7. In other words, the operation restrictor 610 may first determine whether or not the hand state of the driver DR is the driving state and subsequently determine whether or not the driver DR is facing the predetermined region on the side in front.

On the other hand, when it is determined that the disturbed state has been detected in step S210, when it is determined that the driver DR is not facing the predetermined region on the side in front in step S112, or when it is determined that the hand state of the driver DR is not the driving state (the hand state of the driver DR is the non-driving state) in step S114, the operation restrictor 610 determines whether or not the traveling state of the host vehicle M is stable on the basis of information indicating the stability output by the traveling stability detector 609 (step S214).

When it is determined that the traveling state of the host vehicle M is not stable in step S214, the operation restrictor 610 restricts the reception of the operation on the operator of the navigation device 700 (step S130). The operation restrictor 610 ends the process of the present flowchart on the image of the interior of the host vehicle M currently acquired from the camera 100.

On the other hand, when it is determined that the traveling state of the host vehicle M is stable in step S214, the operation restrictor 610 causes the second time measurer 613 to start the measurement of the time period (the second predetermined time period). The operation restrictor 610 determines whether or not the time period measured by the second time measurer 613 exceeds the second predetermined time period (step S216).

When it is determined that the time period measured by the second time measurer 613 has not exceeded the second predetermined time period in step S216, the operation restrictor 610 moves the process to step S120 and ends the process of the present flowchart on the image of the interior of the host vehicle M currently acquired from the camera 100 without restricting the reception of the operation on the operator of the navigation device 700.

On the other hand, when it is determined that the time period measured by the second time measurer 613 has exceeded the second predetermined time period in step S216, the operation restrictor 610 restricts the reception of the operation on the operator of the navigation device 700 (step S130). The operation restrictor 510 ends the process of the present flowchart on the image of the interior of the host vehicle M currently acquired from the camera 100.

According to the above processing, the operation control device 600 determines the state of the driver DR on the basis of the image of the interior of the host vehicle M captured by the camera 100 and controls the reception of the operation on the navigation device 700 on the basis of the determined state of the driver DR as in the operation control device 500 in the first embodiment. At this time, in the operation control device 600, the disturbance detector 605 detects the disturbed state and the traveling stability detector 609 detects the stability of the traveling state of the host vehicle M. Even if the detection of one or both of the direction of the line of sight V of the driver DR and the hand state of the driver DR is disabled, when a primary factor of the disabled detection is due to disturbance of an occupant of the host vehicle M other than the driver DR, a primary factor other than the driver DR, or the like, the operation control device 600 does not restrict the reception of the operation on the navigation device 700 more than necessary before the second predetermined time period (for example, 30 seconds, 1 minute, or the like) elapses if the traveling state of the host vehicle M is stable. That is, for example, the operation control device 600 maintains (continues) a state in which an input operation on the navigation device 700 by the fellow passenger AP who is not involved in the driving of the host vehicle M is allowed before the second predetermined time period elapses while ensuring the safety of the traveling of the host vehicle M using a reference different from that of the operation control device 500 in the first embodiment (the stability of the traveling state of the host vehicle M detected by the traveling stability detector 609, in other words, a reference of a change in the traveling state of the host vehicle M). Moreover, in the operation control device 600, a time period during which a state in which the input operation on the navigation device 700 is allowed is maintained is set to the second predetermined time period so that a time period during which the traveling state of the host vehicle M is stable, but the disturbed state is detected, i.e., a time period during which the driving state of the driver DR cannot be detected, is prevented from being longer than necessary so that the safety of the traveling of the host vehicle M is ensured. Thereby, in the host vehicle M in which the operation control system 2 including the operation control device 600 is mounted, the safety of the traveling of the host vehicle M can be ensured and the convenience for an occupant who is not involved in the driving of the host vehicle M can be improved.

When the disturbed state is eliminated, the driver DR is facing the predetermined region on the side in front, and the hand state of the driver DR is the driving state, the operation restrictor 610 initializes the time period (the second predetermined time period) measured by the second time measurer 613 in step S212. Thereby, in the host vehicle M in which the operation control system 2 including the operation control device 600 is mounted, it is possible to prevent the convenience for an occupant who is not involved in the driving of the host vehicle M from being degraded by immediately restricting the reception of the operation on the operator of the navigation device 700, or shortening a time period during which an operation on the operator of the navigation device 700 is allowed, when the disturbed state will be detected next time.

As described above, the operation control device 600 of the second embodiment determines the state of the driver DR on the basis of the image of the interior of the host vehicle M captured by the camera 100 and performs detection of the disturbed state and detection of stability of the traveling state of the host vehicle M when the reception of the operation on the navigation device 700 is controlled on the basis of the determined state of the driver DR. Thereby, the operation control device 600 of the second embodiment can allow the input operation on the navigation device 700, for example, by the fellow passenger AP or the like who is not involved in the driving of the host vehicle M, as long as the host vehicle M is stably traveling. Thereby, in the host vehicle M in which the operation control system 2 including the operation control device 600 according to the second embodiment is mounted, it is possible to improve the convenience for an occupant who is not involved in the driving of the host vehicle M.

According to the above-described embodiment, for example, the operation control device 500 includes the line-of-sight detector 502 configured to detect the line of sight V of the driver DR of the host vehicle M on the basis of an image of an interior of the host vehicle M captured by the camera 100 provided in the host vehicle M; the hand state detector 504 configured to detect a hand state of the driver DR on the basis of the image; the driving state determiner 506 configured to determine whether the detected hand state is a driving state in which it is estimated that a driving operation of the host vehicle M is being performed or a non-driving state in which it is estimated that the driving operation is not being performed; the traveling state detector 508 configured to detect a traveling state of the host vehicle M; and the operation restrictor 510 configured to restrict reception of an operation on the navigation operation input 704 including the display 708 arranged within the host vehicle M, wherein the operation restrictor 510 does not restrict the reception of the operation in a case where the host vehicle M is in a stopped state, wherein the operation restrictor 510 does not restrict the reception of the operation in a case where the host vehicle M is in the traveling state, a direction of the detected line of sight V is facing a predetermined region on a side in front of the driver DR, and the detected hand state is the driving state, and wherein the operation restrictor 510 restricts the reception of the operation in a case where the host vehicle M is in the traveling state, and the direction of the detected line of sight V is not facing the predetermined region or the detected hand state is the non-driving state, so that it is possible to prevent the input operation on the navigation device 700, for example, by the fellow passenger AP, who is not involved in the driving of the host vehicle M from being restricted more than necessary. Thereby, in the host vehicle M in which the operation control system 1 including the operation control device 500 is mounted, it is possible to improve the convenience for the fellow passenger AP who is not involved in the driving of the host vehicle M.

The embodiment described above can be represented as follows.

An operation control device including:
a hardware processor; and
a storage device storing a program,
wherein the hardware processor reads and executes the program stored in the storage device to:
detect a line of sight of a driver of a vehicle on the basis of an image of an interior of the vehicle captured by an imaging device provided in the vehicle;
detect a hand state of the driver on the basis of the image;
determine whether the detected hand state is a first state in which it is estimated that a driving operation of the vehicle is being performed or a second state in which it is estimated that the driving operation is not being performed;
detect a traveling state of the vehicle;
release a restriction on reception of an operation on an operator including a display device arranged within the vehicle in a case where the vehicle is in a stopped state;
release the restriction on the reception of the operation in a case where the vehicle is in the traveling state, a direction of the detected line of sight is facing a predetermined region on a side in front of the driver, and the detected hand state is the first state; and restrict the reception of the operation in a case where the vehicle is in the traveling state, and the direction of the detected line of sight is not facing the predetermined region or the detected hand state is the second state.

In the embodiment, for example, a case in which the operation control device 500 controls the reception of the input operation on the navigation device 700 has been described. That is, a case in which a target on which the operation control device 500 controls the reception of the operation is the navigation device 700 has been described. However, a target device on which the operation control device 500 controls the reception of the operation may be any device on which an operation by the driver DR is required to be restricted while the host vehicle M is traveling. A process of the operation control device 500 in this case similar to each process in the above-described embodiment is conceivable. Accordingly, description of a process when a target device on which the operation control device 500 controls the reception of the operation is a device other than the navigation device 700 is omitted.

Although modes for carrying out the present invention have been described using embodiments, the present invention is not limited to the embodiments and various modifications and substitutions can also be made without departing from the scope and spirit of the present invention.

What is claimed is:

1. An operation control device comprising:
a line-of-sight detector configured to detect a line of sight of a driver of a vehicle on the basis of an image of an interior of the vehicle captured by an imaging device provided in the vehicle;
a hand state detector configured to detect a hand state of the driver on the basis of the image;
a driving state determiner configured to determine whether the detected hand state is a first state in which it is estimated that a driving operation of the vehicle is being performed or a second state in which it is estimated that the driving operation is not being performed;
a traveling state detector configured to detect a traveling state of the vehicle; and
an operation restrictor configured to restrict reception of an operation on an operator including a display device arranged within the vehicle,
wherein the operation restrictor is configured to not restrict the reception of the operation in a case where the vehicle is in a stopped state,
wherein the operation restrictor is configured to not restrict the reception of the operation in a case where the vehicle is in the traveling state, a direction of the detected line of sight is facing a predetermined region on a side in front of the driver, and the detected hand state is the first state,
wherein the operation restrictor is configured to restrict the reception of the operation in a case where the vehicle is in the traveling state, and the direction of the detected line of sight is not facing the predetermined region or the detected hand state is the second state,
wherein the operation control device further comprises:
a traveling stability detector configured to detect stability of the traveling state of the vehicle; and
a disturbance detector configured to detect a fourth state in which detection of one or both of the direction of the line of sight and the hand state is disabled by an occupant other than the driver on the basis of the image, and
wherein the operation restrictor is configured to continue a state in which the reception of the operation is not restricted in a case where the disturbance detector detects the fourth state, and the traveling stability detector detects that the traveling state of the vehicle is stable in the state in which the reception of the operation is not restricted.

2. The operation control device according to claim 1, wherein the predetermined region includes at least a region of a part or all of a front windshield of the vehicle and a region near a side mirror.

3. The operation control device according to claim 1, wherein the operation restrictor is configured to not restrict the reception of the operation during a first predetermined time period from a point in time when a third state in which detection of one or both of the direction of the line of sight and the hand state is impossible is reached in a state in which the reception of the operation is not restricted.

4. The operation control device according to claim 3, wherein the operation restrictor is configured to initialize a timer for measuring the first predetermined time period at a point in time when the direction of the detected line of sight is facing the predetermined region and the detected hand state is the first state after the third state is lost.

5. The operation control device according to claim 1, wherein the disturbance detector is configured to detect a fifth fourth state in which detection of one or both of the direction of the line of sight and the hand state is disabled due to a factor other than the driver on the basis of the image,
wherein the operation restrictor is configured to continue a state in which the reception of the operation is not restricted in a case where the disturbance detector detects the fifth state and the traveling stability detector detects that the traveling state of the vehicle is stable in the state in which the reception of the operation is not restricted.

6. The operation control device according to claim 1, wherein the operation restrictor is configured to continue a state in which the reception of the operation is not restricted during a second predetermined time period after a state in which the reception of the operation is not restricted, the disturbance detector detects the fourth state, and the traveling stability detector detects that the traveling state of the vehicle is stable is reached.

7. The operation control device according to claim 6, wherein the operation restrictor is configured to initialize a timer for measuring the second predetermined time period at a point in time when the direction of the detected line of sight is facing the predetermined region and the detected hand state is the first state after the fourth state is no longer detected by the disturbance detector.

8. An operation control method using a computer comprising:
detecting a line of sight of a driver of a vehicle on the basis of an image of an interior of the vehicle captured by an imaging device provided in the vehicle;
detecting a hand state of the driver on the basis of the image;

determining whether the detected hand state is a first state in which it is estimated that a driving operation of the vehicle is being performed or a second state in which it is estimated that the driving operation is not being performed;

detecting a traveling state of the vehicle;

releasing a restriction on reception of an operation on an operator including a display device arranged within the vehicle in a case where the vehicle is in a stopped state;

releasing the restriction on the reception of the operation in a case where the vehicle is in the traveling state, a direction of the detected line of sight is facing a predetermined region on a side in front of the driver, and the detected hand state is the first state; and restricting the reception of the operation in a case where the vehicle is in the traveling state, and the direction of the detected line of sight is not facing the predetermined region or the detected hand state is the second state;

wherein the operation control method further comprises:
 detecting stability of the traveling state of the vehicle;
 detecting a fourth state in which detection of one or both of the direction of the line of sight and the hand state is disabled by an occupant other than the driver on the basis of the image, and
 continuing a state in which the reception of the operation is not restricted in a case where the fourth state is detected, and it is detected that the traveling state of the vehicle is stable in the state in which the reception of the operation is not restricted.

9. A computer-readable non-transitory storage medium storing a program for causing a computer to:

detect a line of sight of a driver of a vehicle on the basis of an image of an interior of the vehicle captured by an imaging device provided in the vehicle;

detect a hand state of the driver on the basis of the image;

determine whether the detected hand state is a first state in which it is estimated that a driving operation of the vehicle is being performed or a second state in which it is estimated that the driving operation is not being performed;

detect a traveling state of the vehicle;

release a restriction on reception of an operation on an operator including a display device arranged within the vehicle in a case where the vehicle is in a stopped state;

release the restriction on the reception of the operation in a case where the vehicle is in the traveling state, a direction of the detected line of sight is facing a predetermined region on a side in front of the driver, and the detected hand state is the first state; and restrict the reception of the operation in a case where the vehicle is in the traveling state, and the direction of the detected line of sight is not facing the predetermined region or the detected hand state is the second state;

wherein the program further causes the computer to:
 detect stability of the traveling state of the vehicle;
 detect a fourth state in which detection of one or both of the direction of the line of sight and the hand state is disabled by an occupant other than the driver on the basis of the image, and
 continue a state in which the reception of the operation is not restricted in a case where the fourth state is detected, and it is detected that the traveling state of the vehicle is stable in the state in which the reception of the operation is not restricted.

* * * * *